(12) United States Patent
Carlin et al.

(10) Patent No.: US 10,262,525 B2
(45) Date of Patent: Apr. 16, 2019

(54) NETWORKED AUDIBLE AND VISUAL ALARM APPARATUS FOR SYNCHRONIZED ALERTING WITH A BASE STATION AND ELECTRONIC CODING FOR EACH ALARM

(71) Applicant: Athena Patent Development LLC, Lancaster, NY (US)

(72) Inventors: John A. Carlin, Buffalo, NY (US);
Stephen Scordato, Lockport, NY (US);
Michael Arno, Clarence, NY (US);
Kevin A. Grupp, Clarence, NY (US)

( * ) Notice: Subject to any disclaimer, the term of this patent is extended or adjusted under 35 U.S.C. 154(b) by 28 days.

(21) Appl. No.: 15/452,845

(22) Filed: Mar. 8, 2017

(65) Prior Publication Data
US 2018/0018866 A1    Jan. 18, 2018

Related U.S. Application Data

(60) Provisional application No. 62/361,803, filed on Jul. 13, 2016.

(51) Int. Cl.
*G08B 29/04* (2006.01)
*G08B 17/10* (2006.01)
(Continued)

(52) U.S. Cl.
CPC ........ *G08B 29/043* (2013.01); *F21V 33/0076* (2013.01); *G08B 7/06* (2013.01); *G08B 17/10* (2013.01); *G08B 21/14* (2013.01); *G08B 21/16* (2013.01); *G08B 25/008* (2013.01); *H05B 33/0842* (2013.01); *H05B 37/0236* (2013.01);
(Continued)

(58) Field of Classification Search
CPC ...... G08B 29/043; G08B 25/008; G08B 7/06;
G08B 21/16; G08B 21/14; G08B 17/10;
H05B 33/0809; H05B 37/0236; H05B 37/0272; H05B 33/0842; F21V 3/02;
F21K 9/232; F21K 9/238; F21K 9/235;
F21Y 2115/10
See application file for complete search history.

(56) References Cited

U.S. PATENT DOCUMENTS

| 4,649,376 A | 3/1987 | Frank |
| 5,587,704 A | 12/1996 | Foster |

(Continued)

*Primary Examiner* — Leon Flores
(74) *Attorney, Agent, or Firm* — Vincent G. LoTempio; Kloss, Stenger & LoTempio; David T. Stephenson

(57) ABSTRACT

A networked visual and audible alarm apparatus with base station provides audible and visual alerts upon detection of smoke, carbon monoxide, and gas. The apparatus adapts to a light bulb socket to provide normal lighting when no event is detected. Multiple apparatuses are systematically disposed through different sections of a structure. Each apparatus independently emits an audible signal, dependent on the type of event detected in the respective section for the apparatus. Each alarm apparatus provides a colored high strobe light that illuminates at a color and intensity that varies, dependent on type of event detected. A microphone initiates the audible signal and the high strobe light upon detecting an audible signal from an adjacent alarm apparatus. Voice commands power off the alarming apparatus. A base station controls and monitors a network of apparatuses, and is programmable based on a code that is assigned to each alarm apparatus.

18 Claims, 17 Drawing Sheets

(51) Int. Cl.
*G08B 21/14* (2006.01)
*G08B 21/16* (2006.01)
*G08B 7/06* (2006.01)
*G08B 25/00* (2006.01)
*H05B 33/08* (2006.01)
*H05B 37/02* (2006.01)
*F21V 33/00* (2006.01)
*F21K 9/235* (2016.01)
*F21K 9/238* (2016.01)
*F21K 9/232* (2016.01)
*F21Y 115/10* (2016.01)

(52) U.S. Cl.
CPC .......... *H05B 37/0272* (2013.01); *F21K 9/232* (2016.08); *F21K 9/235* (2016.08); *F21K 9/238* (2016.08); *F21Y 2115/10* (2016.08)

(56) References Cited

U.S. PATENT DOCUMENTS

| | | | |
|---|---|---|---|
| 6,194,994 | B1 | 2/2001 | Curran |
| 6,369,696 | B2 | 4/2002 | Curran |
| 6,545,608 | B1* | 4/2003 | Kaufman ............... G08B 17/12 250/336.1 |
| 6,906,616 | B1 | 6/2005 | Curran |
| 2002/0101345 | A1* | 8/2002 | Pattok .................. G08B 29/145 340/516 |
| 2010/0271802 | A1* | 10/2010 | Recker ............... H05B 33/0803 362/20 |
| 2014/0266747 | A1* | 9/2014 | Prendergast ........... G08B 17/10 340/628 |
| 2015/0312394 | A1* | 10/2015 | Mirza ................. H04M 1/7253 455/420 |
| 2017/0046936 | A1* | 2/2017 | Aebersold ........... G08B 17/103 |
| 2017/0177815 | A1* | 6/2017 | Sundararajan ..... G01N 33/0063 |

* cited by examiner

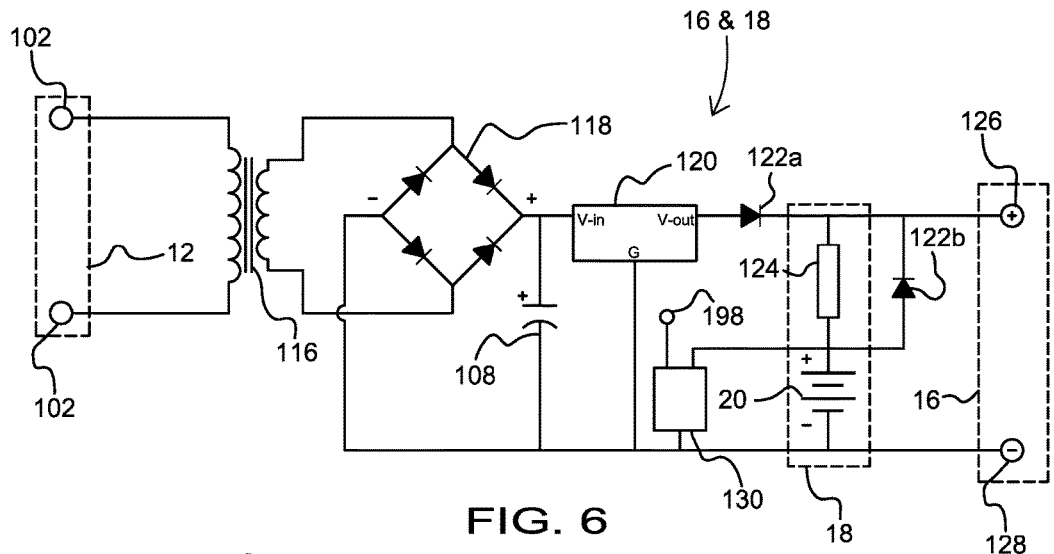
FIG. 6
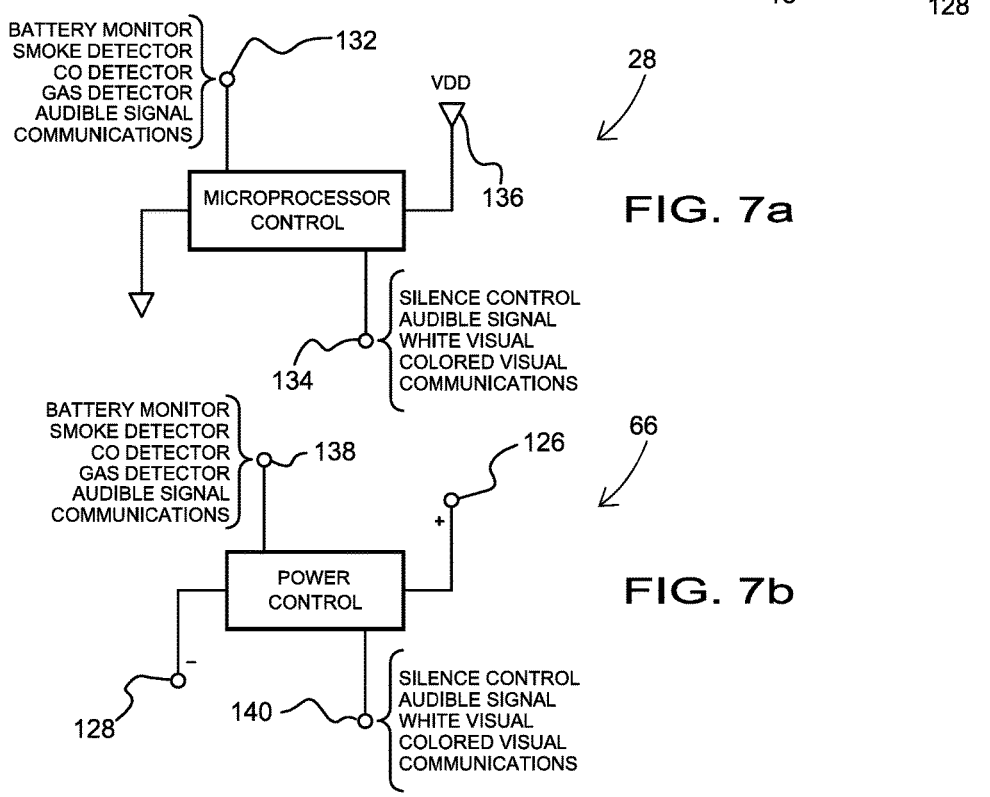
FIG. 7a
FIG. 7b

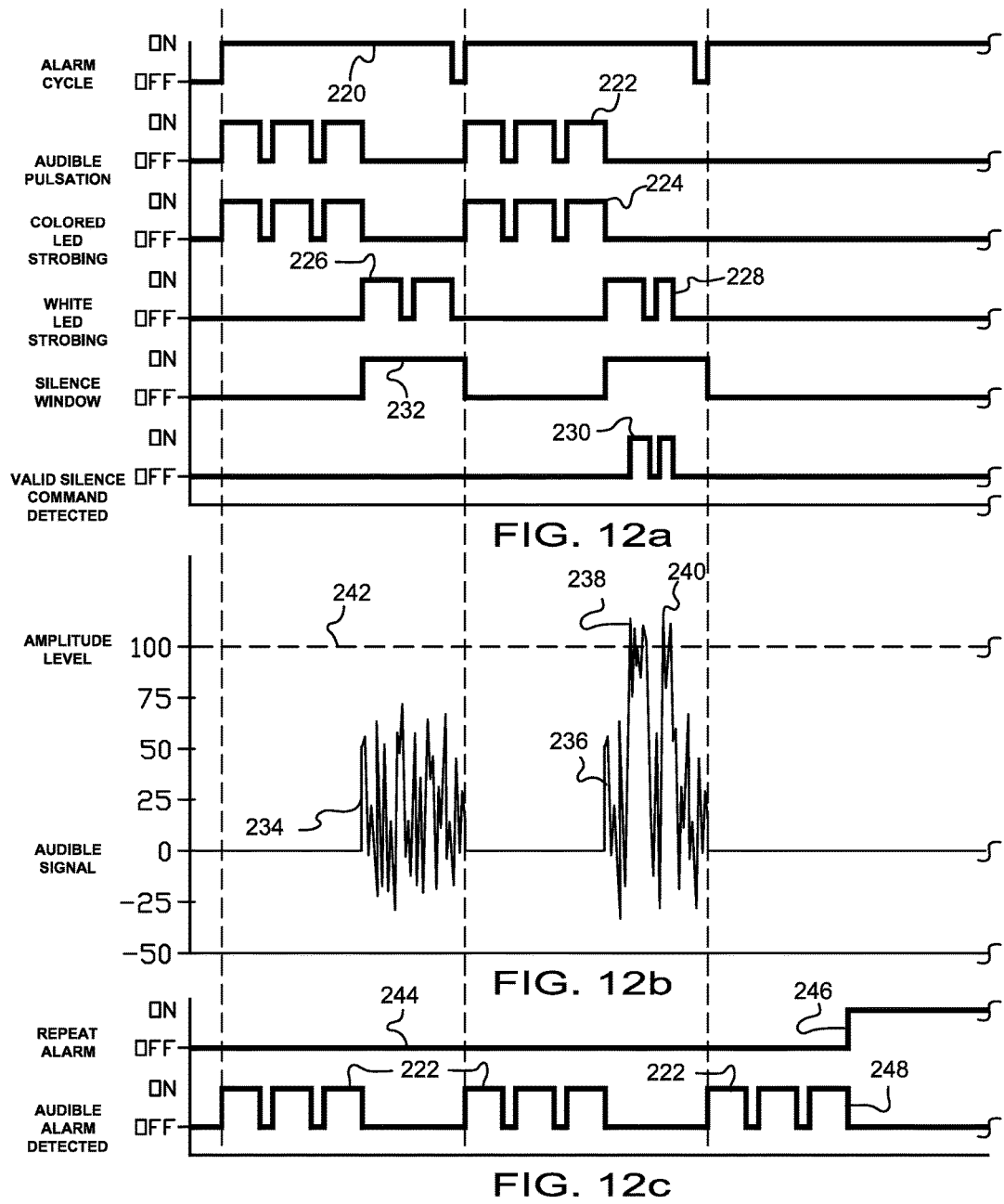

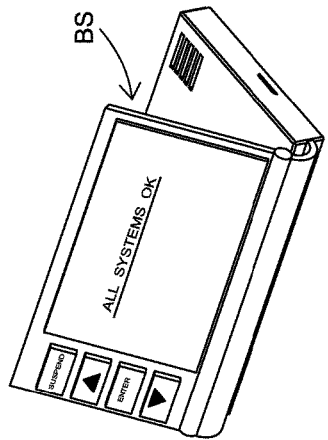
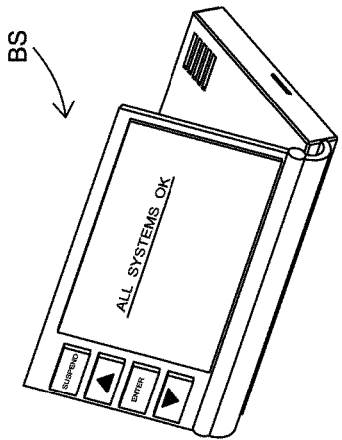
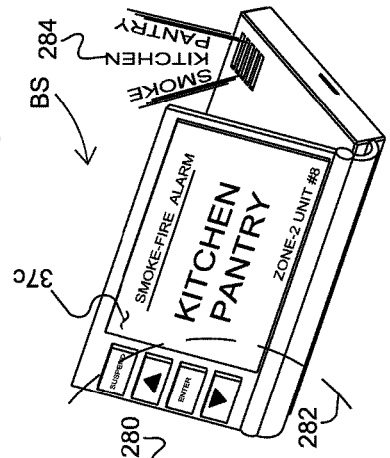
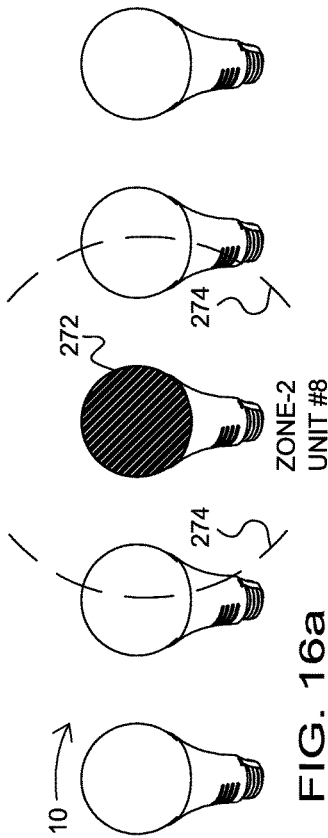
FIG. 16a
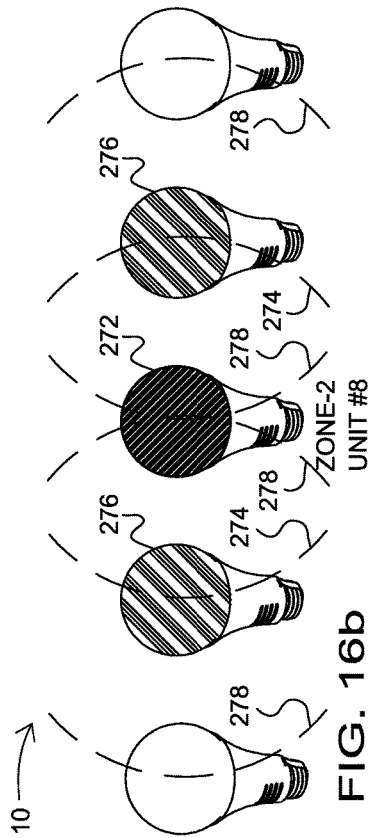
FIG. 16b
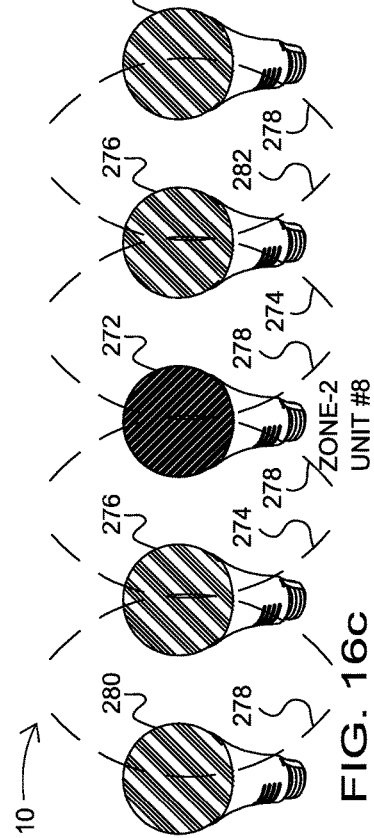
FIG. 16c

NETWORKED AUDIBLE AND VISUAL ALARM APPARATUS FOR SYNCHRONIZED ALERTING WITH A BASE STATION AND ELECTRONIC CODING FOR EACH ALARM

CROSS REFERENCE OF RELATED APPLICATIONS

This application claims the benefits of U.S. provisional application No. 62/361,803, filed Jul. 13, 2016 and entitled IMPROVED LED LIGHT BULB WITH ALARMING APPARATUS FOR SMOKE, CARBON MONOXIDE & GAS, SYSTEM AND METHOD THEREFORE, which provisional application is incorporated by reference herein in its entirety.

FIELD OF THE INVENTION

The present invention relates generally to a networked visual and audible alarm apparatus for synchronized alerting through a base station and electronic coding for each alarm. More so, the present invention relates to the field of illuminating light bulbs that also function as an alarming device, and more particular to the detection of smoke, carbon monoxide or gas for signaling alarms of the presence thereof. The present invention relates to our Co-Invention: IMPROVED LED LIGHT BULB WITH ALARMING APPARATUS FOR SMOKE, CARBON MONOXIDE & GAS AND METHOD THEREFORE. And even more specifically, the present invention relates to an alarm apparatus that provides a plurality of alarm apparatuses networked through a base station or central control; whereby the alarm apparatuses audibly and visually alert to at least one event, such as smoke, carbon monoxide, and general gases; whereby the alarm apparatuses are systematically disposed through different sections of a structure; whereby each alarm apparatus independently emits an audible signal, dependent on the type of event detected in the respective section for the alarm apparatus; whereby each alarm apparatus illuminates a high strobe light at a variable color and intensity, dependent on the type of event detected in the respective section of the alarm apparatus; whereby the alarm apparatuses comprises a microphone for listening for a silence alarm command, and for communicating with adjacent alarm apparatuses of lesser functionality apparatus of the inventors earlier patent (sound only), so as to initiate the audible signal and the high strobe light upon detecting an audible signal from an adjacent alarm apparatus; the present patent utilizing a higher function of radio frequency (RF) with coded signals to communicate, having both sound and RF signaling capabilities, assures that all apparatuses (one with lesser functions and those with higher functions) are compatible with base station control; and whereby each alarm apparatus emits an independent audible signal and high strobe light, dependent on the type of event in the specific section of the alarm apparatus; whereby the alarm apparatuses comprise a voice activated control portion for enabling a user to power off the alarm apparatus when in the alarm mode.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In the field of Light Emitting Diode (LED) light bulbs, there exists a need to expand their usefulness. Likewise, in the fields of smoke and/or carbon monoxide/gas detection devices, there exist a need to enlarge their utility. In countless applications of these devices, there is no crossover of functionality, where the placement of an illuminating light bulb could also signal and alarm of a deadly element present in the immediate environment: said signaling that could produce both an audible and visual alarm and be monitored at a base station.

Generally, smoke detectors that detect the products of combustion and sound an alarm when a concentration threshold is exceeded are coming into widespread use. Since most are powered by batteries or house current and permanently placed in rooms, recreational vehicles and the like, each room to be fully protected must include a separate detector. When the alarm sounds, the person immediately evacuates the building. The use of smoke detectors as well as carbon monoxide detectors have become much more common and widespread than in the past.

Smoke and carbon monoxide alarming devices, manufactured in their most common configuration for homes, etc., provide a level of self-assurance and are a must to have in any home for safety; while a slightly more sophisticated configuration can be found in every office, institution and industry setting. It is known that many jurisdictions require smoke detectors be strategically placed within both residential and commercial buildings at the time of construction or during remodeling recognizing that such devices can and oftentimes do save lives. Similarly, carbon monoxide detectors have become more widespread recognizing that carbon monoxide, although deadly, is an odorless gas preventing one's senses from recognizing the inherent danger.

Typically, LED light bulbs are manufactured in most any style lamp to match older incandescent bulbs, and even newer halogen, florescent, etc. type bulbs, to give illumination. These devices are very useful and use just a fraction of energy to operate them over prior art lighting technologies. Most LED lamps are produced using 120 VAC Line power (220/230 VAC depending where in the world they are marketed) as the supply voltage, to provide and easy and convenient direct replacement, and are found more and more homes, offices and industry.

While it is obvious that these independent devices have tremendous acceptance around the world, it is their independent character that leads to problematic situations. For example, even though lights are virtually everywhere in a home, should a smoke detector audibly signal an alarm, the lights do not turn on to aid in firstly, a visual signaling of the alarm, and secondly, to illuminate the affected area. Another problem is when a smoke detector signals alarm from a minor mishap; such as someone burning toast.

This has virtually happened to everyone, and the results are that the smoke detector is disassembled by removing the battery to silence the 'nuisance' alarm, or if powered by line, disconnecting the line power; just to keep peace. Still another example is when these battery operated smoke and carbon monoxide/gas detecting devises run low on battery power, they emit an audible 'chirp' to indicate their battery needs to be replaced.

Although this is good and practical information, many such as elderly or the disabled, can do nothing to stop the constant chirping of a low battery smoke or carbon monoxide detector device. They must simply stay in their homes and endure the annoyance of the audible chirping until an able boded person can change-out the battery. This situation of changing batteries can be a challenge even too many so called normal people; due to lack of being able climb a step ladder or stand on a stool.

In many instances, having a light bulb that incorporates a smoke detector, carbon monoxide detector or gas detector. This can include natural gas, propane, or radon gas. The light bulb may be charged with a rechargeable battery, which would greatly reduce or eliminate the aforementioned problems. Such a device would be configured to replace any conventional light bulb in table lamps, recessed ceiling fixtures, furniture lamps, track lighting, nightlights, etc., and operate as usual with respect to lighting.

When AC Line power is provided, the light will illuminate. Further the AC Line power will keep the rechargeable battery at full charge, and provide power for the detecting circuits of smoke or carbon monoxide. When the AC Line is OFF, the battery will keep alive necessary circuitry to monitor for smoke or carbon monoxide and would signal alarm if necessary.

A light bulb that incorporates a smoke, carbon monoxide or gas detectors, and, with a rechargeable battery would signal alarm both audibly and visually. The audible signal would be the familiar piercing pulsation of sound, and, the visual signaling would be a strobing alternately of high intensity white and colored LED's. The colored LED's would indicate the 'type' of danger present, such as red for smoke and amber for carbon monoxide and blue for gas (all being a dangerous environment, and, if just repeating the alarm would indicate the alarm in green strobing light; meaning the area does not have the presence of smoke, carbon monoxide or gas; but is nearby.

In the case of an annoyance signaling of an alarm, such as the earlier mentioning of burning toast, the apparatus further would incorporate a silencing circuit. This silencing circuit would listen, between the audible pulse emissions. If it hears two sharply structured reverberations, such as in someone shouting the words (within its silencing range) "SHUT OFF" within the brief window of time, the device would suspend the alarm state, for example one minute. If the air was not cleared after that period of suspension of time, the alarm would continue. The user could tell it to shut-up again until all air is clear. No one need to remove the battery just to make peace and quiet.

An improved apparatus would also include a testing means of both the audible and visual alarming, such as by turning the apparatus ON/OFF/ON in quick succession, within one second to activate a test mode. In the test mode the alarm state will last for five second, for example, or, be silenced via a silence command response.

In the case of a low battery situation, for example in a room that is rarely used like a guest bedroom, the device would 'chirp' as usual in prior art, if the battery gets too low. But unlike the situation mentioned above, where a helpless individual has had to endure the continued annoyance of the chirping low battery detector, the user of the present invention would simple turn the lamp or fixture ON for a short period of time. This would sufficiently re-charge the battery and chirping would immediately stop.

The present patent provides structure to effect a more efficient means to both illuminate rooms in any home or building as well as provide smoke and/or carbon monoxide and/or gas detection to signal alarm; all in one direct replaceable package, configured to any conventional light bulb of any technology. The result of this unique approach, reduces the stressful need to silence annoyance alarms by removing the battery until the air is cleared, and, the painful enduring of low battery chirping. Alarm signaling means are both audible and visual, and work either on AC Line power or its own rechargeable DC battery power.

Further, the present patent makes it favorably ease to install. One needs only to replace their current prior art light bulb with the improved LED light bulb apparatus with smoke or carbon monoxide or gas detection and signaling, of the disclosed device. A home or building could have as many of these improved light/smoke detecting (carbon monoxide detection or gas) lamps as there are fixtures, creating a network of alarm signaling devices; greatly improving the self-assurance of lives.

Further, the undesirable effects of independent lights and smoke/carbon monoxide/gas detections devices of prior art are all eliminated. If the contemplated optional short-range communications connectivity circuit is present in the device, and an alarm is activated by one unit, other similar devices within the defined range can also activate their alarms; giving further rise to a potentially dangerous situation.

This networking of these improved lighting/detecting apparatuses would give a possible safer escape route by the colored LED light at each localized alarming device. That is, red indicating smoke is present, amber indicating carbon monoxide is present, blue indicating gas is present, and green meaning neither smoke nor carbon monoxide is present, but, in a repeat alarm state to give rise of a danger within range (nearby) of another network device that is signaling a danger alarm.

Other proposals have involved illuminating alarms. The problem with these alarms is that they are not networked to each other to indicate an event in another section of the structure and also to indicate an exit pathway. Also, the batteries often run out of energy, thereby causing the alarm to be inoperable. Even though the above cited alarms meets some of the needs of the market, an apparatus used as an illuminating light bulb that also functions as an alarming device, and more particular to the detection of smoke, carbon monoxide or gas for signaling alarms of the presence thereof is still desired.

In the field of Light Emitting Diode (LED) light bulbs, there exists a need to expand their usefulness. Likewise, in the fields of smoke and/or carbon monoxide/gas detection devices, there exist a need to enlarge their utility. In countless applications of these devices, there is no crossover of functionality, where the placement of an illuminating light bulb could also signal and alarm of a deadly element present in the immediate environment: said signaling that could produce both an audible and visual alarm.

Finally, there is no convenient monitoring base station or central control for typical homes and buildings; excluding the above mentioned slightly more sophisticated configuration smoke and carbon monoxide detectors that can be found in large office, institution and industry setting, where they are 'hard-wired' together and powered by AC Line power with battery backup systems. These units are found in large facilities and have location identification means, usually at their main entrance, and are meant for the fire department to quickly find a fire-breakout in the building (not the user to ascertain their localized situation other than simply alarming an audible signal).

One solution to the problem would be to have a light bulb that incorporates a smoke detector, carbon monoxide detector or gas detector (such as natural gas), and, with a rechargeable battery, would greatly reduce or eliminate the aforementioned problems. Such a device would be configured to replace any conventional light bulb in table lamps, recessed ceiling fixtures, furniture lamps, track lighting, nightlights, etc., and operate as usual with respect to lighting. When AC Line power is provided, the light will illuminate. Further the AC Line power will keep the rechargeable battery at full charge, and provide power for the detecting circuits of smoke or carbon monoxide/gas. When the AC Line is OFF, the battery will keep alive necessary circuitry to monitor for smoke or carbon monoxide/gas and would signal alarm if necessary.

The light bulb that incorporates a smoke, carbon monoxide or gas detectors, and, with a rechargeable battery would signal alarm both audibly and visually. The audible signal would be the familiar piercing pulsation of sound, and, the visual signaling would be a strobing alternately of high intensity white and colored LED's. The colored LED's would indicate the 'type' of danger present, such as red for smoke and amber for carbon monoxide and blue for gas (all being a dangerous environment), and, if just repeating the alarm would indicate the alarm in green strobing light; meaning the area does not have the presence of smoke, carbon monoxide or gas; but is nearby.

In the case of an annoyance signaling of an alarm, such as the earlier mentioning of burning toast, the apparatus further would incorporate a silencing circuit. This silencing circuit would listen, between the audible pulse emissions. If it hears two sharply structured reverberations, such as in someone shouting the words (within its silencing range) "SHUT OFF" within the brief window of time, the device would suspend the alarm state, for example one minute. If the air was not cleared after that period of suspension of time, the alarm would continue. The user could tell it to shut-up again until all air is clear. No one need to remove the battery just to make peace and quiet.

An improved apparatus would also include a testing means of both the audible and visual alarming, such as by turn the apparatus ON/OFF/ON in quick succession, within one second to activate a test mode. In the test mode the alarm state will last for five second, for example, or, be silenced via a silence command response. In a system wide test, the base-station would 'query' the network of apparatus of the present invention, to test both audible and visual strobing, network wide.

In the case of a low battery situation, for example in a room that is rarely used like a guest bedroom, the device would 'chirp' as usual in prior art, if the battery gets too low. But unlike the situation mentioned above, where a helpless individual has had to endure the continued annoyance of the chirping low battery detector, the user of the present invention would simple turn the lamp or fixture ON (providing VAC Line power) for a short period of time. This would sufficiently re-charge the battery and chirping would immediately stop.

The present patent provides structure to effect a more efficient means to both illuminate rooms in any home or building as well as provide smoke and/or carbon monoxide and/or gas detection to signal alarm; all in one direct replaceable package, configured to any conventional light bulb of any technology. The result of this unique approach, reduces the stressful need to silence annoyance alarms by removing the battery until the air is cleared, and, the painful enduring of low battery chirping.

Alarm signaling means are both audible and visual, and work either on AC Line power or its own rechargeable DC battery power. Further, the present patent makes it favorably ease to install. One needs only to replace their current prior art light bulb with the improved LED light bulb apparatus with smoke or carbon monoxide or gas detection and signaling, of the disclosed device. A home or building could have as many of these improved light/smoke detecting (carbon monoxide detection or gas) lamps as there are fixtures, creating a system network of alarm signaling devices; greatly improving the self-assurance of lives.

Further, the undesirable effects of independent lights and smoke/carbon monoxide/gas detections devices of prior art are all eliminated. With the RF short-range communications connectivity circuit in each device, should an alarm be activated by one unit, other similar devices within the defined range can also activate their alarms; giving further rise to a potentially dangerous situation. This networking of these improved lighting/detecting apparatuses would give a possible safer escape route by the colored LED light at each localized alarming device. That is, red indicating smoke is present, amber indicating carbon monoxide is present, blue indicating gas is present, and, green meaning neither smoke nor carbon monoxide or gas is present, but, in a repeat alarm state to give rise of a danger within range (nearby) of another network device that is signaling a danger alarm.

And with great importance, a base station control center, meant to be located in the master bedroom and other centrally located arias such as a kitchen or family room (at the crossroads of activity), would read these transmitted signals of alarm via coded ID and display their status and locations. Still further, the base station means can read, non-registered 'like' apparatuses, such as in a neighbors dwelling, in an adjacent apartment building or other joining living spaces, to give an early warning alarm of nearby danger.

Prior to the filing of this application, the subject inventors conducted a patentability investigation in the field light bulbs, LED lighting, smoke, carbon monoxide & gas detectors and related systems. The following patents were uncovered in the search.

| Inventor | Reg. No. | Date |
| --- | --- | --- |
| Prendergast | US 2014/0266747 A1 | Sep. 18, 2014 |
| Lax | U.S. Pat. No. 7,786,879 B2 | Aug. 31, 2010 |
| Bradley, et al. | US 2009/0237260 A1 | Sep. 24, 2009 |
| Lax | US 2007/02852 A1 | Dec. 13, 2007 |
| Scripps | U.S. Pat. No. 4,694,285 | Sep. 15, 1987 |

Prendergast—In the U.S. Patent Application, 2014/0266747 A1 has paired smoke and carbon monoxide detectors concealed within a light fixture. These paired detection devices are electrically coupled to a light bulb comprising a lighting fixture. They are effectively a smoke detector, a carbon monoxide detector all within a light fixture.

Lax—U.S. Pat. No. 7,786,879 B2 will screw into a 110-volt light socket and uses a rechargeable battery within smoke and carbon monoxide detector. The detector has indicating LED's showing available 110-volt power, or smoke detected, or carbon monoxide detected as well as a speaker. The apparatus will receive a 110-volt light bulb so the socket can continue to be used as a light source.

Bradley, et al. —U.S. Patent Application, 2009/0237260 A1 having a base containing a threaded female socket similar to a standard light bulb, and, a corresponding male threaded connector. The apparatus thus is able to be electrically connected to, as well as physically mounted to, by simply screwing the male threaded connector into the female threaded socket; making the device serviced as easily as changing a light bulb.

Lax—U.S. Patent Application, US 2007/0285262 A1 will screw into a 110-volt light socket and uses a rechargeable battery within smoke and carbon monoxide detector. The detector has indicating LED's showing available 110-volt power, or smoke detected, or carbon monoxide detected as well as a speaker. The apparatus will receive a 110-volt light bulb so the socket can continue to be used as a light source.

Scripps—U.S. Pat. No. 4,694,285 combines an electrical smoke, heat detector and electrical light in a single unit which may be attached to an electrical fixture. Also within the housing is a light socket for reception of a light bulb. The smoke and heat detector can alarm when sensor is activated.

None of the above approaches in the prior art discloses a means for integrating a LED lighting means with smoke, carbon monoxide and gas detection means within a single bulb 'housing' envelope. Also none of the listed prior art can or will directly replace a conventional sized or shaped light bulb, configured to any style or type. They all present housings of some structure that 'fit' between a lighting fixture and a conventional light bulb. And as such, thus making it impossible to be installed practicably into common lighting possibilities in general homes or buildings.

While some of the prior art does detect smoke or carbon monoxide, they do not signal alarm both in audible and visual strobing of high intensity, with alternating different color light. Please note that some prior art listed has an LED 'indicating' an alarm. These LED's cannot be defined from any distance, say across a room, and most certainly cannot in a smoky environment as may be present in the case of a smoke alarm. They simply indicate that an alarm state is active (much like a stereo may have an LED to indicate that it is ON), and have no practicable value as a visual stimulus meaning a danger is present; as would be by strobing high intensity LED's of alternating white and color specific lights, giving urgency to the alarm situation, such as red for smoke, amber for carbon monoxide, blue for gas, and green none of the above in the immediate area, but indicating a danger is nearby.

Further, none of the prior art addresses a silencing of nuisance alarms (as in the case of accidentally burning toast mentioned earlier), to temporarily suspend an alarm state, by someone simply shouting the words "SHUT OFF" (or the alike) within the brief window of time, to silence the alarm. And finally, none of the prior art contemplated a communicate means via a short range RF coded ID signal to transmit and receive, that an alarm has been activated. While other 'like' improved LED light bulbs, of the present invention, would respond to said signals, and repeat the alarm state. Thus, should an alarm active, due to smoke, carbon monoxide or gas detection in the farthest area of a home, the alarm signal would migrate through the remaining home, warning of a dangerous situation.

In the case of the above scenario, only the lighting units physically sensing smoke, carbon monoxide or gas would pulse with the high intensity white and colored LED's (red for smoke, amber for carbon monoxide and blue for gas respectively). All the other lighting units, not physically sensing smoke, carbon monoxide or gas would pulse with the high intensity white LED' and green LED's. This networking, via coded ID signals and read by a base station displaying the exact type, location and urgency, of the improved light bulb within a network, of the present invention, is intended to give direction as to where the danger is physically in the building.

That is, for example, one responding in the middle of the night, to a base-station giving notice of smoke in the laundry room, and if one then exited to the middle of a long hallway such as from a bedroom, and high intensity white and red LED's were strobing at one end (the laundry room), and, high intensity white LED's and green at the other end, the way to exit the building would be to the white & green end. Importantly, the LED light bulb of the present invention not only gives audible and visible alarming, but, through networking via short range RF communications with other like devices can guide users out of the building in the most practical exiting manner, away for the danger. The base-station control center, ties all system units (lamp/detectors apparatuses) together, affording immediate and timely updated status of the whole network as dangerous events unfold nearby, and provide useful emerging, escape information.

SUMMARY

Illustrative embodiments of the disclosure are generally directed to a networked visual and audible alarm apparatus for synchronized alerting through a base station and electronic coding for each alarm. The alarm apparatus serves to provide both audible and visual alerts upon detection of at least one event, such as smoke, carbon monoxide, and gases. The signaling from the alarm apparatuses would produce both an audible and visual alarm. Multiple alarm apparatuses can be in communication to form a network, such that the apparatuses communicate through audible transmission of pulsations. The alarm apparatuses also emit variously colored strobe lights to indicate to occupants of a structure the type of danger and to highlight exit and entry points in the structure.

The alarm apparatus, and network of multiple alarm apparatuses are monitored and controlled from a base station, or central control. The base station is operable to program, monitor and display all detection apparatuses in the building network area, such as a home. The base station provides control and information to the user that is unavailable by any other means. The base station is programmed with a unique coding system to establish identification of the device manufacturing iteration, a house code, a unit number and location designator, and an alarm category. Thus, each alarm apparatus has its own, unique code. The base-station also enables connectivity with a cellular line, a land-line, and a computer.

The base station is meant to be located in the master bedroom and other centrally located arias such a kitchen or family room; where there are the crossroads of activity, would read these transmitted signals of alarm and display their status and locations. Additionally, the base station means can read, non-registered 'like' apparatuses, such as in a neighbors dwelling in an apartment building or other joining living spaces, to give an early warning alarm of nearby danger. A unique electronic coding ID system would tie together the alarm apparatuses with the base station for an efficient communication protocol.

In one possible embodiment, the alarm apparatus provides multiple alarm apparatuses in each section, i.e., room of a structure. The apparatuses work to audibly and visually alert to at least one event, such as smoke, carbon monoxide, and general gases. The alarm apparatus also serve the dual purpose of providing normal lighting when no event is detected. In some embodiments, the alarm apparatus may include a uniquely configured light bulb that is interchangeable with a standard light bulb known in the art. The alarm apparatuses are systematically disposed through different sections of a structure, such as a building or home. As discussed above, the base station serves as the central control for all the alarm apparatuses.

Each alarm apparatus independently emits an audible signal, dependent on the type of event detected in the respective section for the alarm apparatus. Further, each alarm apparatus provides a visual alert in the form of a high strobe light that illuminates at a color and intensity. The color and intensity for each alarm apparatus varies, dependent on the type of event detected in the section of the alarm apparatus. For example, a first alarm apparatus that detects smoke may emit an audible siren and a red light. A second alarm apparatus in an adjacent section of the structure that detects carbon monoxide may emit an audible siren and an amber light.

There is also a third alarm apparatus in another adjacent section of the structure that detects a gas, such as natural gas, propane gas or radon gas, and, that emits an audible siren and a blue light. And finally, there is a forth alarm apparatus that does not detect smoke, carbon monoxide, or gas. The fourth alarm apparatus emits a green LED strobe array to illuminate a safe pathway for exiting the structure. Though in other embodiments, additional alarm apparatuses and colors may be used to detect other hazards known in the art.

The alarm apparatuses may also include a microphone for communicating with each other. The microphone enables an alarm apparatus to initiate the audible signal and the high strobe light upon detecting an audible signal from an adjacent alarm apparatus. In this manner, even when an alarm apparatus does not detect the event, the audible signal and a light is still initiated. This serves to indicate that there is an event occurring in another section of the structure, and also serves to create a lighted pathway towards an exit, when the alarm apparatuses are synchronized. Thus, each alarm apparatus emits an independent audible signal and high strobe light, dependent on the type of event in the specific section of the alarm apparatus.

Furthermore, the microphone operatively connects to a voice activated control portion. The voice activated control portion allows the alarm apparatus to be powered off through voice commands, such as "shut off" or "Turn off" the alarm. A rechargeable battery or a direct AC line may be used to power the alarm apparatus.

One objective of the present invention is to provide an improved LED light bulb apparatus that incorporates a smoke detector into the bulb envelope housing, while maintaining substantially the standard style and shape of the conventional light bulb housing.

Another objective of the present invention for an improved LED light bulb apparatus is incorporating a carbon monoxide detector means into the bulb envelope housing, while maintaining substantially the standard style and shape of conventional light bulb housing.

A further objective of the present invention for an improved LED light bulb apparatus is incorporating a gas, such as natural gas or propane, detector means into the bulb envelope housing, while maintaining substantially the standard style and shape of conventional light bulb housing.

Another objective of the present invention for an improved LED light bulb apparatus is incorporating both a smoke, a carbon monoxide and a gas detector means into the same bulb envelope housing, while maintaining substantially the standard style and shape of conventional light bulb housing.

Another objective is to incorporate the present invention into any style/type/shape housing of conventional light bulbs, lighting fixtures or lamps; making the improved apparatus disclosed herein, easily a direct replacement for any prior art devices preexisting.

One further objective in said housings will have partitions, separating areas of the internal space. Typically, there are three such spaces; a LED light interior, an electronics chamber and a detector/audible horn/microphone space.

Still another objective of the powering circuits is configured to any particular design need that can use a transformerless layout, or, the use of step-down transforms. The design needs being a consideration for the end use of the present invention in any given application.

Yet another objective of the present invention for an improved LED light bulb apparatus is having an audible pulse emission means that in an alarm state would pulsate. Such pulsation can be rhythmic, for example 3 beats ON and 1 beat OFF. This audible pattern is intended to give urgency.

Another objective of the present invention for an improved LED light bulb apparatus is to have high intensity white, and, high intensity color (such as RED for smoke & fire, AMBER for carbon monoxide, BLUE for gas, and GREEN for a repeat alarm) LED's that strobe alternately ON while in an alarm state. Such strobing makes a visible alarm that matches the pulsation of the audible alarming and is intended to give urgency.

Still another objective of the present invention is to have a 'silencer circuit'. This silencing circuit would listen, between the audible pulse emissions. If it hears two sharply structured reverberations, such as in someone shouting the words "SHUT OFF" (or the alike) within a brief window of time, the device would suspend the alarm state, for example one minute. If the air was not cleared after that period of suspension of time, the alarm would continue. The user could provide a command to shut-off again until the ambient air is clear of smoke, gas, etc.

Still another objective is to us both the audible and visual alarming means to test, by turn the apparatus ON/OFF/ON in quick succession, within one second to activate a test mode. In the test mode, the alarm state will last for five second for example, or, be silenced via a silence command response. A further test feature can be accomplished via a 'query' command by a base-station to cycle through each alarm element of an audible and LED strobing means.

Yet another objective is for the same microphone listening device mentioned above, would listen for audible alarm detected pattern of sound, and if detected would repeat the alarm; thereby creating a network of two or more like apparatuses of the present invention (like in function, not housing type or style). This is in addition to a convention RF communication means if the apparatus is so equipped in the embodiment.

A further objective is a non-removable, rechargeable battery power source. The battery source may have a dormant state until the end user creates a 'one-time' activating means initialized at instillation. The rechargeable battery, to keep alive all necessary circuitry during periods when VAC Line power is not available. The battery is always kept at peak capacity when the line voltage is present, and therefore is ready to cover periods when the VAC line voltage is off.

Another objective is to provide a microprocessor or ASIC (application-specific integrated circuit) mean to control universally all aspects of operation of the present invention.

Another objective is to restrict circuitry by selectively powering the apparatus of the present invention, while it is in a 'quiescent' state. That is, a state where the apparatus is not in an alarm state, and therefore can power-down unneeded drains on battery operation.

Yet another objective of the present invention for an improved LED light bulb apparatus is to give audible notice when there is a low battery situation, the device would 'chirp' as conventional, usually in battery operated devices if the battery gets too low. That is, emit a very short duration pulse of sound, for example once per minute. To correct this low battery situation, the user would simply turn the present invention apparatus, lamp or fixture, ON (providing AC Line power) for a short period of time. This would sufficiently re-charge the battery and chirping would immediately stop.

Yet another objective of the present invention for an improved LED light bulb apparatus, is to communicate via RF short range signaling, or, listen via the on-board microphone, that an alarm event was activated. The present unit, detecting the alarm situation, would alternate pulsing of audible and high intensity white and red (amber or blue) LED's for the visual signal of an event. While, any other like (in function) improved LED light bulb within range of the present unit, but not in the smoke, carbon monoxide or gas environment, would repeat the audible signaling and visual signaling of the alarm, but would not present the red, amber or blue LED pulsating, instead use a green high intensity LED's; until or when it also detected the smoke or carbon monoxide or gas. The green LED's pulsing with the white here would indicate a possible 'safer' escaping route. Thus, such an apparatus would give direction as to possible exiting away from the danger. Further, during a silence window (period of time in each alarm cycle), the repeat apparatus would listen for any sound meeting an amplitude threshold, and, if hearing none, or in receiving a RF signal to stop, would stop (in the case of the alarming unit stops alarming), the repeat alarming both audibly and strobing white and green LED's.

Yet another objective of the present invention is a base station to program, monitor and display all detection apparatuses in the building network area (such as a home). The base station provides control and information to the user that is unavailable by any other means. The base station is programmed with a unique coding ID system to establish identification of the device manufacturing iteration, a house code, a unit number and location designator, and an alarm category. The base-station also enables connectivity with a cellular line, a land-line, and a computer, if desired for further dissemination of info.

Yet another objective of the present invention is a repeat feature, strobing green LED's that indicate a danger is nearby but not immediately present such as a neighbor alarming device, give warning for occupants to exit to safety; away from any red, amber or blue strobing LED apparatus, which indicate immediate danger at its location.

Yet another objective is to have a means to register and assign a 'coded ID' to each individual apparatus in the network (Personal House Code, Zone-#, Location Description, Type of Fixture, Unit-#, Type of Alarm Category, etc.) making unique, and immediately identifying, which unit(s) are alarming. This is to include any near-by neighbor with a like system & apparatus, which will show-up as an un-register alarming unit; but still giving rise to a danger nearby in another apartment or dwelling.

The present invention takes advantage of all these objectives by directly replacing a conventional light bulb, configured in any conventional style or shape, with an improved LED light bulb incorporating a smoke detector, carbon monoxide detector or gas detector; by having a non-removable rechargeable battery always available and ready to alert in both audible and visual strobing pulsations, and, can be silenced by simply telling it verbally to SHUT OFF; using any two sharply structured reverberations (words/syllables) in a sequence of speech sounds.

The improved device would be constructed to all existing lighting lamp configurations, making them easy to replace existing conventional lighting and thus make it easy to up-grade the home or building to a higher level of self-assurance by having base station(s) in or around the main places a user would find convenient (such as the master bedroom, kitchen or family room, or crossroads of activity) and would display exact locations and type/category of alarms that became activated. The disadvantages of prior art listed earlier are all overcome and the user of the present invention can remove older independent smoke and carbon monoxide alarming devices that require constant replacing of batteries, and are subject to annoying false triggering of the alarm, that cannot be silenced conveniently, e.g., they need to remove the battery to silence, and, do not alarm with visible means. The improved LED light bulb apparatus of the present invention uniquely solves problems that prior art cannot.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 6 discloses a schematic sketch circuitry for a DCV power regulator Block 16, recharge circuit Block 18 and battery 20 in FIG. 1a and FIG. 1b, in accordance with an embodiment of the present invention;

FIG. 7a is microprocessor based illustration of Block 28 providing central control of all aspects of the present invention, in accordance with an embodiment of the present invention;

FIG. 7b illustrates a discrete components Block 66 version of FIG. 7a, in accordance with an embodiment of the present invention;

FIG. 12a, is a waveform mapping a first state shown in FIG. 11 for generating circuits illustrated in FIGS. 7, 9, and 10, in accordance with an embodiment of the present invention;

FIG. 12b, is a waveform mapping a second state shown in FIG. 11 for generating circuits illustrated in FIGS. 7, 9, and 10, in accordance with an embodiment of the present invention;

FIG. 12c, is a waveform mapping a third state shown in FIG. 11 for generating circuits illustrated in FIGS. 7, 9, and 10, in accordance with an embodiment of the present invention;

FIG. 16a is an illustration of the present invention network, where a single unit detects smoke and alarms, in accordance with an embodiment of the present invention;

FIG. 16b is an illustration of the present invention network, where the close in-range units receive and repeat transmits detects smoke of first said unit alarm, in accordance with an embodiment of the present invention;

FIG. 16c is an illustration of the present invention network, where the close second in-range units receive and repeat transmits detects smoke of first said unit alarm, and, is received by base-station, in accordance with an embodiment of the present invention;

Like reference numerals refer to like parts throughout the various views of the drawings.

DETAILED DESCRIPTION OF THE INVENTION

Figure 1A:
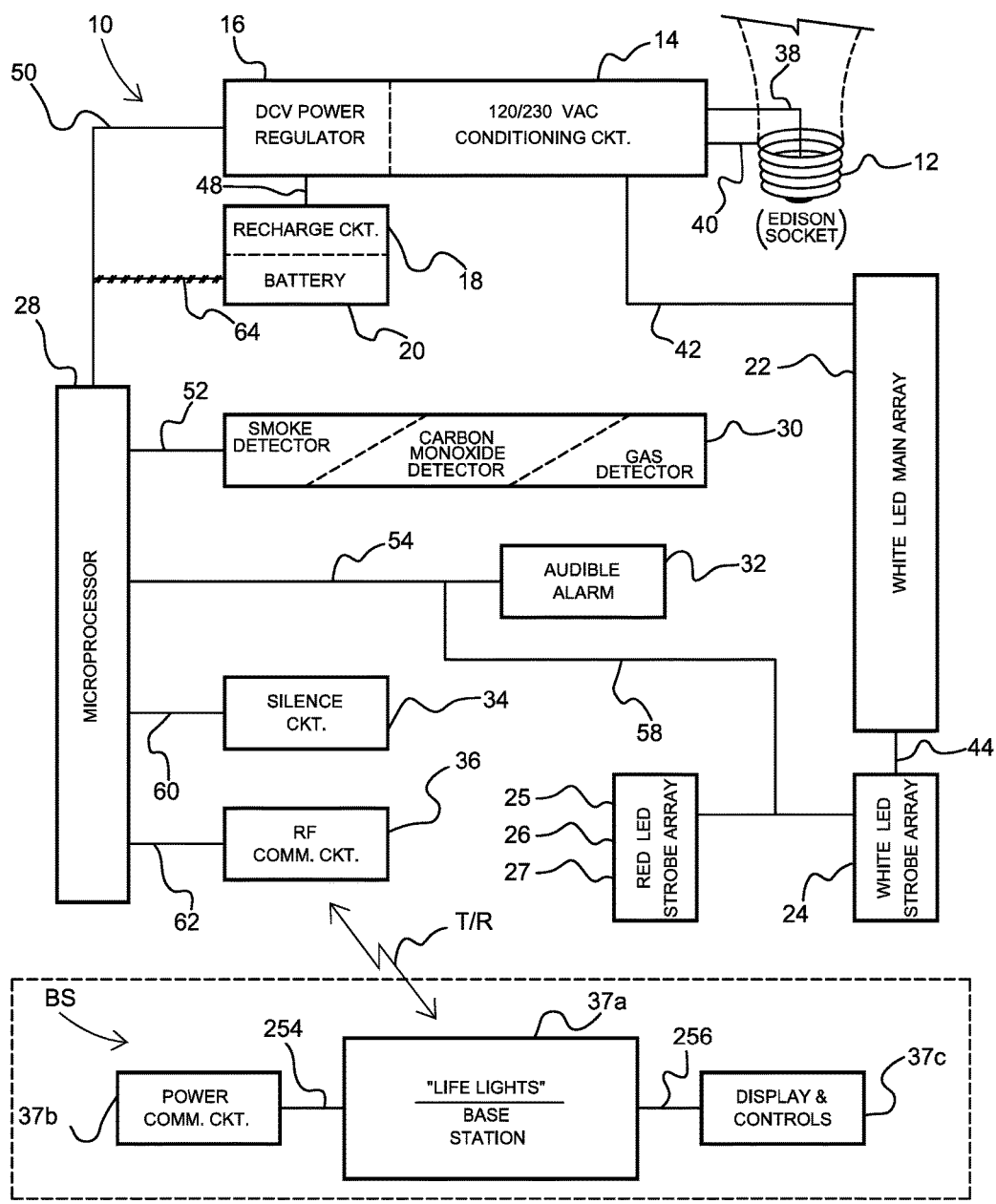
FIG. 1a is a block diagram of the present invention using microprocessor based components, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1a. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A networked visual and audible alarm apparatus 10 for synchronized alerting is referenced in FIGS. 1a-18b. The alarm apparatus 10 serves to provide both audible and visual alerts upon detection of at least one event, such as smoke, carbon monoxide, and various dangerous gases known in the art. In one embodiment, the alarm apparatuses 10 is configured to audibly and visually alert to at least one event, such as smoke, carbon monoxide, and general gases that are harmful to occupants of a structure. The alarm apparatus 10 is also adapted to operatively couple to a light bulb socket, so as to provide standard lighting when no event is detected. The apparatus takes the structural appearance of a normal light bulbs known in the art, so as to be interchangeable.

Illustrative embodiments of the disclosure are generally directed to a networked visual and audible alarm apparatus for synchronized alerting through a base station and electronic coding for each alarm. The alarm apparatus serves to provide both audible and visual alerts upon detection of at least one event, such as smoke, carbon monoxide, and gases. The signaling from the alarm apparatuses would produce both an audible and visual alarm. Multiple alarm apparatuses can be in communication to form a network via transmitting and receiving coded ID signals with radio frequency (RF) techniques, and/or other audible techniques (so as to not obsolete lesser functional devices in the network, such that the apparatuses communicate through audible transmission of pulsations. The alarm apparatuses also emit variously colored strobe lights to indicate to occupants of a structure the type of danger and to highlight exit and entry points in the structure.

The alarm apparatus 10, or network of multiple alarm apparatuses, are monitored and controlled from a base station BS, 37a, 37b, 37c, or central control. The base station BS, 37a, 37b, 37c is operable to program, monitor and display all detection apparatuses in the building network area, such as a home or commercial building. The base station BS, 37a, 37b, 37c provides control and information to the user that is unavailable by any other means.

In some embodiments, the base station BS, 37a, 37b, 37c may be located in the master bedroom and other centrally located arias such a kitchen or family room, representing the crossroads of activity. The base station BS, 37a, 37b, 37c detects, or reads transmitted signals from the individual alarm apparatuses, and displays their status and locations. Additionally, the base station can read, non-registered 'like' apparatuses, such as in a neighbors adjacent dwelling in an apartment building or other joining living spaces, to give an early warning alarm of nearby danger. The coding system 270 would tie together the alarm apparatuses with the base station BS, 37a, 37b, 37c for an efficient communication protocol.

The base station BS, 37a, 37b, 37c is programmed based on a code 270 for each alarm apparatus. This unique coding system to establish identification of the device manufacturing iteration, a house code, a unit number and location designator, and an alarm category. The base station BS, 37a, 37b, 37c also enables connectivity with a cellular line, a land-line, and a computer; if desired. Thus each alarm apparatus has its own unique code 270.

For example, each apparatus is registered and assigned a 'coded ID' to each individual apparatus in the network (Personal House Code, Zone-#, Location Description, Type of Fixture, Unit-#, etc.) making unique, and immediately identifying, which unit(s) are alarming, and importantly, the type/category of alarm. This is to include any near-by neighbor with a like system & apparatus, which will show-up (on the base station BS, 37a, 37b, 37c) as an un-register alarming unit; but still giving rise to a danger nearby in another apartment or dwelling.

In one possible embodiment, the alarm apparatus provides multiple alarm apparatuses in each section, i.e., room of a structure. The apparatuses work to audibly and visually alert to at least one event, such as smoke, carbon monoxide, and general gases. The alarm apparatus also serve the dual purpose of providing normal lighting when no event is detected. In some embodiments, the alarm apparatus may include a uniquely configured light bulb that is interchangeable with a standard light bulb known in the art. The alarm apparatuses are systematically disposed through different sections of a structure, such as a building or home. As discussed above, the base station serves as the central control for all the alarm apparatuses.

Each alarm apparatus independently emits an audible signal, dependent on the type of event detected in the respective section for the alarm apparatus. Further, each alarm apparatus provides a visual alert in the form of a high strobe light that illuminates at a color and intensity. The color and intensity for each alarm apparatus varies, dependent on the type of event detected in the section of the alarm apparatus. For example, a first alarm apparatus that detects smoke may emit an audible siren and a red light. A second alarm apparatus in an adjacent section of the structure that detects carbon monoxide may emit an audible siren and an amber light.

There is also a third alarm apparatus in another adjacent section of the structure that detects a gas, such as natural gas, and that emits an audible siren and a blue light. And finally, there is a forth alarm apparatus that does not detect smoke, carbon monoxide, or gas. The fourth alarm apparatus emits a green LED strobe array to illuminate a safe pathway for exiting the structure. Though in other embodiments, additional alarm apparatuses and colors may be used to detect other hazards known in the art.

The alarm apparatus ideally communicates in the synchronizing network using radio frequency (RF) signaling techniques; such as Bluetooth, ZigBee, etc. to transmit and receive activity, e.g., alarming events or no events; a so-called quiescent state. However, the alarm apparatuses may also include a microphone for communicating 'using sound' with each other. Thus, not obsoleting a lesser functional apparatus (not equipped with RF communications means). The RF signals or microphone listening for sounds that meets the criteria, enables an alarm apparatus to initiate the audible signal and the high strobe light upon detecting an audible signal from an adjacent alarm apparatus. In this manner, even when an alarm apparatus does not detect the event, the audible signal and a light is still initiated. This serves to indicate that there is an event occurring in another section of the structure, and also serves to create a lighted pathway towards an exit, when the alarm apparatuses are synchronized. Thus, each alarm apparatus emits an independent audible signal and high strobe light, dependent on the type of event in the specific section of the alarm apparatus.

Furthermore, the microphone operatively connects to a voice activated control portion. The voice activated control portion allows the alarm apparatus to be powered off through voice commands, such as "shut off" or "Turn off" the alarm. A rechargeable battery or a direct AC line may be used to power the alarm apparatus.

It is explicitly understood, that the base station (BS, 37a, 37b, 37c) can, either along with or be incorporated via software into, other 'conveniences' electronic devices.

These devices, such as Amazon Corporation's Alexa/Echo system, or Google's Home system, etc., can further augment the base station/control center of the present invention; making them even more useful.

FIG. 1a references a block diagram of one possible embodiment of the apparatus 10. Here, the apparatus 10 provides an electrical connection 12 (depicted here as the familiar Edison, 'A-19' style socket). A 120/230 VAC conditioning circuit 14, a DCV power regulator circuit 16, a recharge circuit 18 and a rechargeable battery 20. Further is shown, a white LED main array 22, a white LED strobe array 24 and a colored LED strobe array green 25, red 26, and amber/blue 27 as they relate to the conditioning circuit 14, and, a control microprocessor 28, as it relates to the DCV power regulator 16. The control microprocessor 28 directly controls detector(s) 30, a smoke/carbon monoxide/gas detector(s) 30a, 30b, and 30c respectively, an audible alarm circuit 32, a silence circuit 34 and a communication circuit 36. The present invention can be of a simpler configuration without the communication circuit, or, the communication circuit can be present to incorporate networking features that will be disclosed in a later section. A series of lines 38, 40, 42, 44, 46, 48, 50, 52, 54, 56, 58, 60, 62 and 64 are shown providing interconnection to the various blocks or the diagram.

Conditioning circuit 14 supplies 120/230 VAC power to DCV regulator 16 and white LED main array 22, white LED strobe array 24 and a colored LED strobe array green 25, red 26, and amber/blue 27. The DCV power regulator provide commercial power for charging the battery 20 by the recharge circuit 18, and all of the other control components 28, 30, 32, 34, 36. In operation, when 120/230 VAC (Line Voltage) is available and present at the electrical connection means 12, the apparatus functions as follows:

Conditioning circuit 14 steps-down and rectifies the VAC Line Voltage first, to the high intensity light emitting diodes (LED's) in the arrays 22 and 24, providing illuminances in the emission of visible light, and second, provide power to the DCV regulator 16 that supplies control power and the recharging of the battery as needed. Should the Line Voltage be OFF, or not present, the battery 20 will supply all necessary power to circuits 28, 30, 32, 34, 36 and the two LED strobe arrays 25, 26 & 27, 24 when in the alarm state. It is important to understand that the white LED's in the strobe array 24 function with, and exactly the same as, white LED's in the main array 22. Only when in battery mode of operating, do the white LED's strobe the array 24, should there be an alarm. A more detailed description of all these functions will be disclosed later.

Figure 1B:
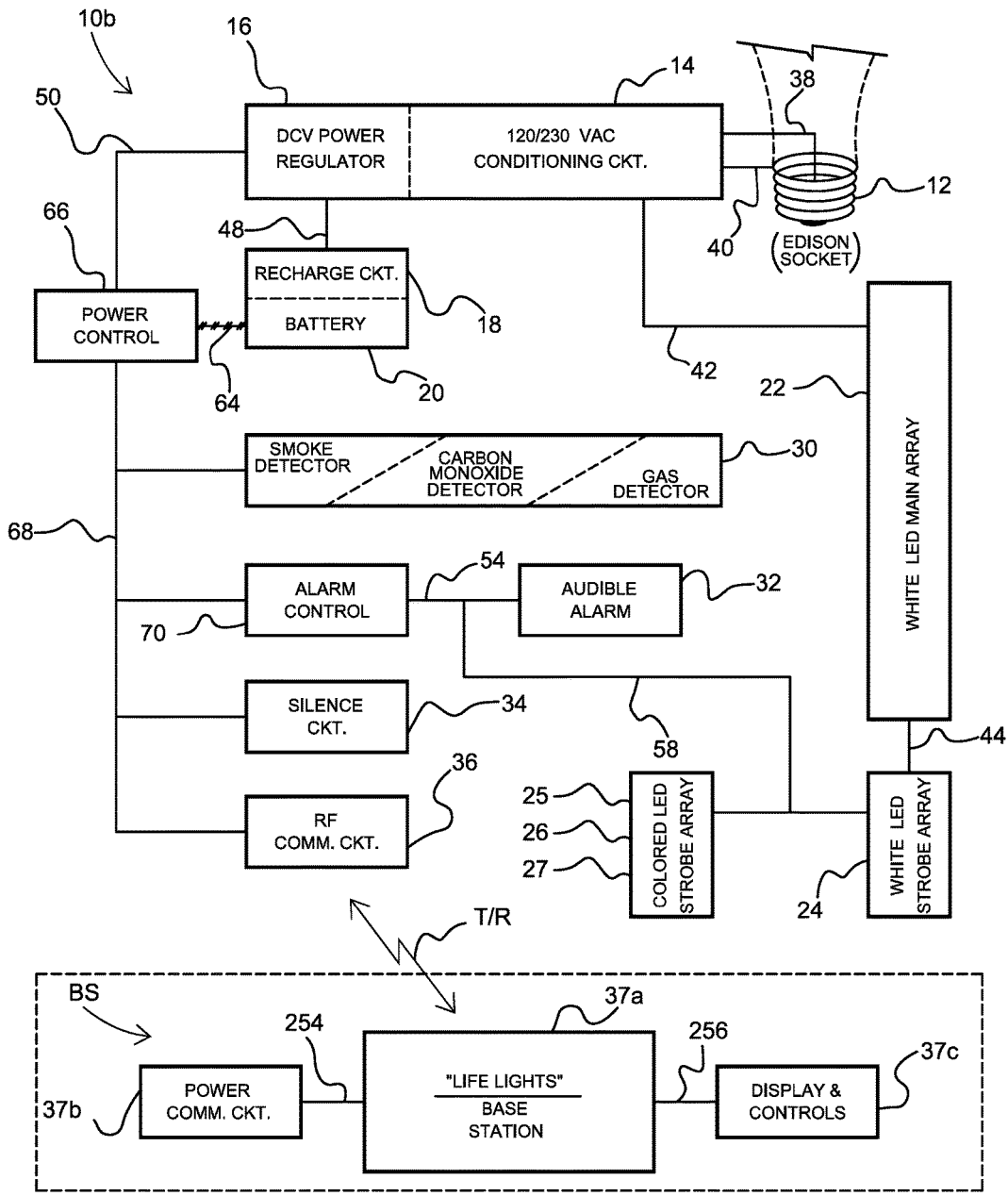
FIG. 1b is a block diagram of an alternate embodiment of the present invention using discrete components, in accordance with an embodiment of the present invention.

Moving to a first alternate embodiment having discrete components in FIG. 1b, where it is shown a block diagram of the present invention 10b, discrete components, having an electrical connection means 12 (depicted here as the familiar Edison, 'A-19' style socket). A 120/230 VAC conditioning circuit 14, a DCV power regulator circuit 16, a recharge circuit 18 and a rechargeable battery 20. Further is shown, a white LED main array 22, a white LED strobe array 24 and a colored LED strobe array green 25, red 26, and amber/blue 27, as they relate to the conditioning circuit 14, and, a monitor circuit 66, as it relates to the DCV power regulator 16. The monitor circuit 66 oversees a smoke/carbon monoxide/gas detector(s) 30, an alarm control 70 (with audible alarm circuit 32), a silence circuit 34 and a communication circuit 36. The present invention can be of a simpler configuration without the communication circuit, or, the communication circuit can be present to incorporate networking features that will be disclosed in a later section. A series of lines 38, 40, 42, 44, 46, 48, 50, 54, 56, 58, 64 and 68 are shown providing interconnection to the various blocks or the diagram.

Conditioning circuit 14 supplies 120/230 VAC power to DCV regulator 16 and white LED main array 22, white LED strobe array 24 and a colored LED strobe array 26. The DCV power regulator provide commercial power for charging the battery 20 by the recharge circuit 18, and all of the other control components 66, 30, 70, 32, 34, 36. In operation, when 120/230 VAC (Line Voltage) is available and present at the electrical connection means 12, the apparatus functions as follows:

Conditioning circuit 14 steps-down and rectifies the VAC Line Voltage first, to the high intensity light emitting diodes (LED's) in the arrays 22 and 24, providing illumination in the emission of visible light, and second, provide power to the DCV regulator 16 that supplies control power and the recharging of the battery as needed. Should the Line Voltage be OFF, or not present, the battery 20 will supply all necessary power to circuits 66, 30, 70, 32, 34, 36 and the two LED strobe arrays 25, 26 & 27 and 24 when in the alarm state. It is important to understand that the white LED's in the strobe array 24 function with, and exactly the same as, white LED's in the main array 22. Only when in battery mode of operating, do the white LED's strobe the array 24, should there be an alarm. A more detailed description of all these functions will be disclosed later.

Figure 2A:
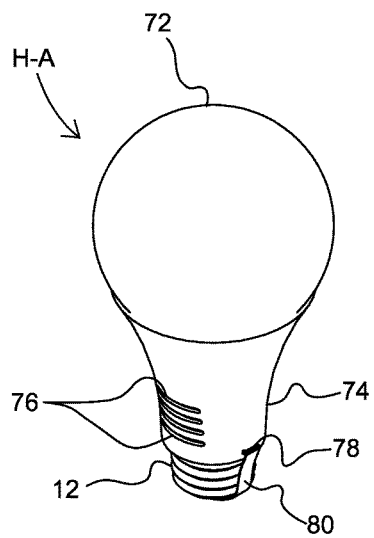
FIG. 2a is a perspective view showing the outside of a common 'Edison' style, type A19 light bulb envelop housing, in accordance with an embodiment of the present invention.

Turning now to FIG. 2a is shown a perspective view of the outside of a common 'Edison' style, type A19 light bulb 'envelop', housing H-A. The housing H-A having electrical connection means 12, as depicted in FIGS. 1a & 1b earlier. A light-defusing reflector 72, an electronics casing 74, a series of vents 76, an activating pin 78 and pull ribbon 80 are also shown. The light-defusing reflector 72 allows an even emission of illumination when the LED's of the main array 22, strobe arrays 24 & 25, 26 or 27 are turned ON. The electronics casing 74 holds the operating components of the present invention and has vents 76 to allow smoke and/or carbon monoxide and/or gas to enter and exit the housing H-A. The vent 76 also allows sound to enter and exit the housing H-A. The activating pin 78 with ribbon 80, when removed from housing H-A, will actuate an internal means (as will be disclosed later), to initiate operations. Since the ribbon 80, intentionally covers a portion of the electrical connection means 12, the apparatus H-A cannot be installed into a lamp until the pin 78 is removed, thus bringing to life the battery system and the electronics. This is important to understand, because the pin 78 will keep the battery from being depleted prior to the apparatus is brought into service.

Figure 2B:
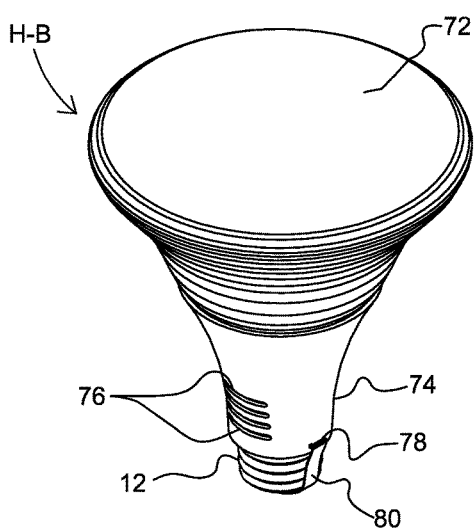
FIG. 2b is a perspective view showing the outside of a common 'flood' style, type BR-30 light bulb envelop housing, in accordance with an embodiment of the present invention.
Figure 2C:
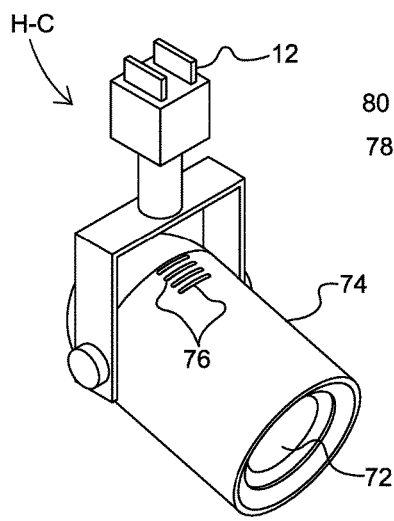
FIG. 2c is a perspective view showing the outside of a common 'track' style, light housing, in accordance with an embodiment of the present invention.
Figure 2E:
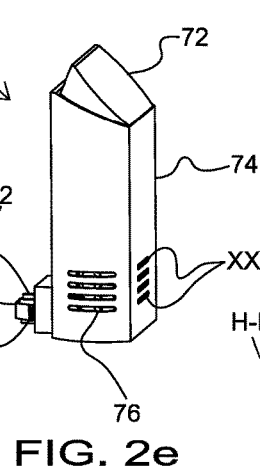
FIG. 2e is a perspective view showing the outside of a common 'nightlight' style, light housing, in accordance with an embodiment of the present invention.
Figure 2D:
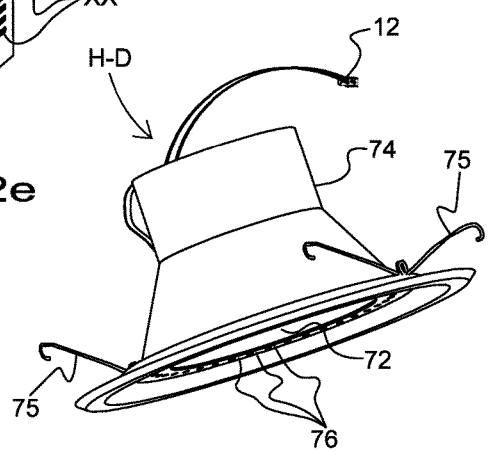
FIG. 2d is a perspective view showing the outside of a common 'recessed' style, light housing, in accordance with an embodiment of the present invention.

FIG. 2b through FIG. 2e are all the same in function and operation as disclosed in FIG. 2a; only the form has changed as follows. FIG. 2b being a perspective view showing the outside of a common 'flood' style, type BR-30 light bulb envelop housing H-B; FIG. 2c is a perspective view showing the outside of a common 'track' style, light housing H-C; FIG. 2d is a perspective view showing the outside of a common 'recessed' style, light housing H-D; and, FIG. 2e is a perspective view showing the outside of a common 'nightlight' style, light housing H-E. Each housing H-B, H-C, H-D and H-E respectively, holding the present invention 10 (as will be seen in FIG. 3) and operating as disclosed in FIG. 1a or 1b.

Figure 3A:
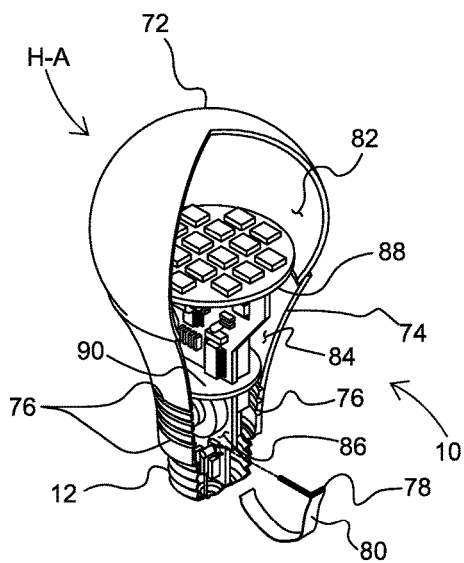
FIG. 3a is a perspective view with cut-away showing the inner chambers and components of a common 'Edison' style, type A19 light bulb envelop housing, in accordance with an embodiment of the present invention.

Moving to FIG. 3a is a perspective view with cut-away showing the inner chambers and components of a common 'Edison' style, type A19 light bulb envelop, housing H-A. A LED light interior 82, an electronics chamber 84 and a detector & microphone space 86 are shown, and created by, a LED mounting plate 88 and a partition 90. The LED mounting plate 88 also is a heat-sink to dissipate any heat generated by the LED's when they are turned ON. The partition 90 keeps smoke and or carbon monoxide and or gas that may enter the vents 76, isolated only to the detector, horn & microphone space 86. Again with FIG. 3*b* through FIG. 3*e*, all the same in function and operation as disclosed in FIG. 3*a*; only the form has changed as follows.

Figure 3B:
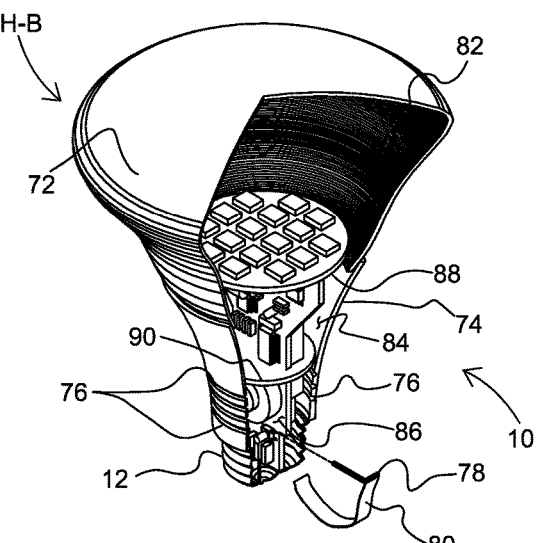
FIG. 3b is a perspective view with cut-away showing the inner chambers of a common 'flood' style, type BR-30 light bulb envelop housing, in accordance with an embodiment of the present invention.
Figure 3C:
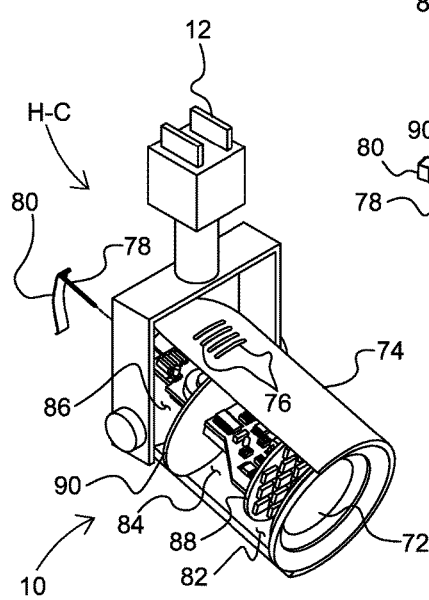
FIG. 3c is a perspective view with cut-away showing the inner chambers of a common 'track' style, light housing, in accordance with an embodiment of the present invention.
Figure 3E:
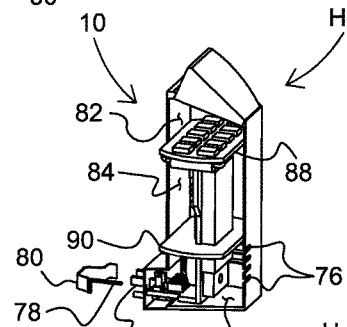
FIG. 3e is a perspective view with cut-away showing the inner chambers of a common 'nightlight' style, light housing, in accordance with an embodiment of the present invention.
Figure 3D:
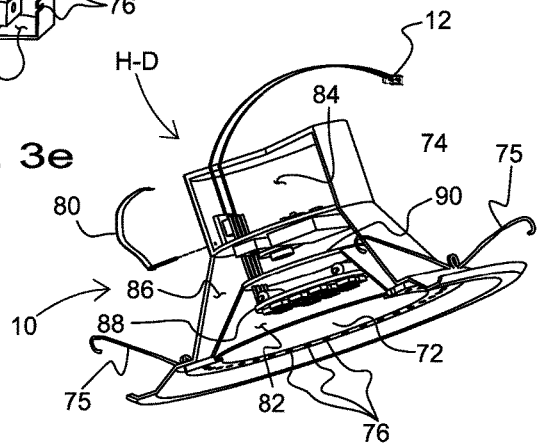
FIG. 3d is a perspective view with cut-away showing the inner chambers of a common 'recessed' style, light housing, in accordance with an embodiment of the present invention.

FIG. 3*b* is a perspective view with cut-away showing the inner chambers of a common 'flood' style, type BR-30 light bulb envelop housing H-B; FIG. 3*c* is a perspective view with cut-away showing the inner chambers of a common 'track' style, light housing H-C; FIG. 3*d* is a perspective view with cut-away showing the inner chambers of a common 'recessed' style, light housing H-D, and FIG. 3*e* is a perspective view with cut-away showing the inner chambers of a common 'nightlight' style, light housing H-E. Each housing H-B, H-C, H-D and H-E respectively, holding the present invention 10 (as will be seen in FIG. 3) and operating as disclosed in FIG. 1*a* or 1*b*.

Although the inventors have disclosed five (5) styles of light bulbs and lamp fixtures, it is explicitly understood that the present invention 10 can be fitted into any light/lamp housing style or type of fixture. For example, a few other standard 'series' types are: A-Series, B-Series, C7/F Series, CA-Series, S-Series, F-Series, RP, MB, BT Series, R-Series, MR-Series, PS Series, AR-Series, ALR-Series, BR-Series PAR-Series, T-Series, BT-Series, ED-Series. Further there are the European Base E-Series, the Bayonet Series, the high voltage series as well as the low voltage pin series, and the G-Series including fluorescent tube.

Still there are more, but the inventors have clearly shown an improved LED light bulb with alarming apparatus for smoke, carbon monoxide detection and gas, in five different configurations of commonly found lighting devices that are shown here are sufficient enough, for anyone skilled in the art, to understand the invention, and, were only limited by the practical need to keep this disclosure shorter in length.

Figures 4A, 4B:
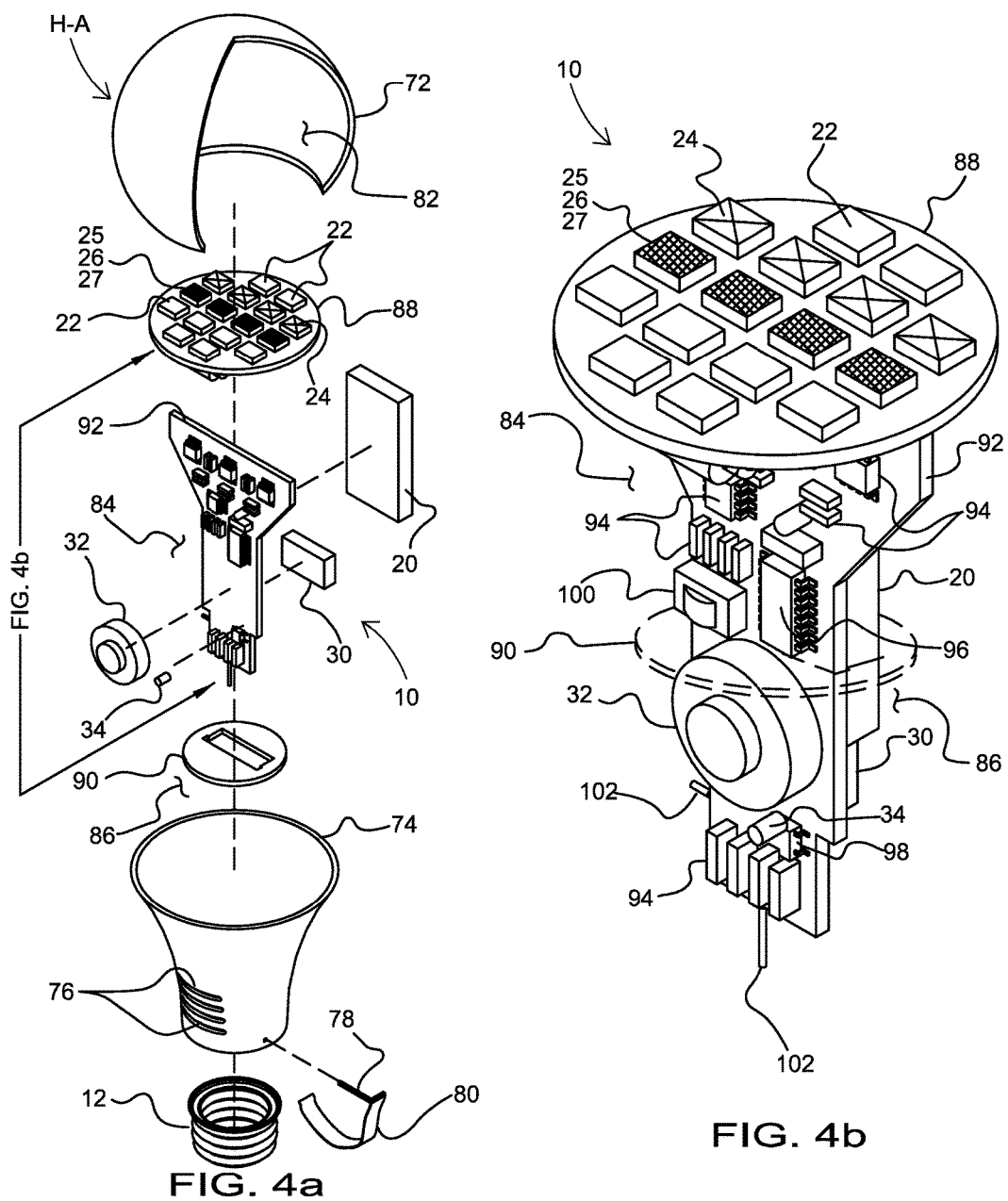
FIG. 4a is an illustration of the present invention of FIG. 2a showing an exploded view of one possible layout of components, in accordance with an embodiment of the present invention.
FIG. 4b is an assembled detail of the present invention as it would fit into the Edison style A-19 housing of FIG. 2a, in accordance with an embodiment of the present invention.

FIG. 4*a* is a perspective view illustration of the present invention of the H-A housing in FIG. 2*a*, showing an exploded view of one possible layout of components. The partially cut-away light-defusing reflector 72, revealing the LED light interior 82 space and the LED mounting plate (with heat sink) 88. The LED mounting plate 88 has disposed on it, the high intensity white LED main array 22, the high intensity white LED strobe array 24 and the high intensity colored LED strobe array, green 25, red 26 and amber & blue 27. The colored LED's strobing would give the visual alarm and will be further discussed later.

The electronics chamber 84 'space' has within, a print circuit board (PCB) 92. Disposed on the PCB 92, are the rechargeable battery 20, smoke/carbon monoxide/gas detectors 30, the audible alarm 32 horn/siren, and the silence circuit 34 microphone. RF communications circuit 36 also disposed in this section of PCB 92, will be discussed later. The lower portion of the PCB 92 is isolated via partition 90; which is positioned just above audible siren/horn 32 and smoke/carbon monoxide/gas detector 30, and, thereby creates the detector, horn & microphone space 86. FIG. 4*b* will better detail this section of the assembly in greater clarity.

Finally, the electronics casing 74 provides cover for the above assembly, including 88, 92 20, 30, 32, 34, 36 and 90 just mentioned. Note the lower section, at the detector & microphone space 86 area, has the vents 76 to allow smoke and/or carbon monoxide and/or gas to flow into and out of space 86, as well as, to allow sound to emanate therefrom via the audible siren/horn 32, and, hear external sound via silence circuit 34 microphone. The vents 76, in the preferred embodiment, have disposed on the inner surface of electronics casing 74, a screen (not shown for clarity of presentation) to prevent objects from entering the casing 74 vent holes; only smoke, carbon monoxide, gas or sound can freely enter and exit the space 86 as disclosed.

Look now at FIG. 4*b* to see a detail of the present invention 10, showing the improved LED light bulb with alarming apparatus for smoke, carbon monoxide and gas detection assembly as it would fit into the Edison style A-19 housing of the exploded view of FIG. 4*a*. Here is shown LED arrays 22, 24 and 25, 26 & 27 disposed atop LED mounting plate 88. The mounting plate 88 is conventionally constructed with circuit current flow patterns on the LED top-side, and with a heat sink (such as aluminum) on the bottom-side. The number of high intensity LED's, in both the main 22 and strobe 24 & 25, 26 & 27 arrays, are defined by the amount of luminescence desired. In this example of the A-19 style bulb, H-A of FIG. 2*a*, are twelve of the white LED's in the main 22 and strobing 24 arrays, during normal lighting functions. While there are four of the colored LED's strobing 25, 26 & 27 'alarm state'. It should be understood that any number of LED's, either greater or less, can be implemented on to LED mounting plate 88 to facilitate any given housing configuration and desired lumens.

The PCB 92 having the partition 90 shown in dashed line for clarity of presentation. The PCB 92 and the LED mounting plate 88 are electrically connected (not shown) using simple conventional 'pin' connection devices meant for mating two printed circuit boards; at the top edge of 92 and the bottom surface of 88. Operating current and signals flow over said connecting pins. A variety of electronic, surface mount electronic components 94, integrated circuits 96 such as microprocessor and RF communications means, and step-down (means) transformer 100, are disposed on PCB 92. These components will be detailed in a later section. On the underside of the partition 90, at the lower end of PCB 92, is disposed the audible alarm siren/horn 32, silence circuit 34 microphone and smoke/carbon monoxide/gas detector(s) 30. Further is disposed an activation means 98 (which is engaged with activation pin 78).

In the preferred embodiment the activation means 98 is a switch that is positioned during manufacturing. The switch, activation means 98, isolates the rechargeable battery 20, so none of the circuits are powered, until and when, the activation pin 78 is removed via the pull ribbon 80 during installation of the device into service. It is important to understand that once the activating pin 78 is removed, and the switch, activation means 98 is toggled, the switch cannot be toggled back to an OFF position again. Thus the device is fully functional for its service life. A further disclosure of these functions will be detail later.

Further disclosures are seen in FIGS. 5 through 10, where there is shown typical circuitry to make functional the blocks in FIGS. 1*a* and 1*b*. The inventors use the words 'typical circuitry' here, specifically to emphasize that there are many ways to achieve the form and function described in the blocks of FIGS. 1*a* & 1*b*, and, although there is a preferred way, it should not be construed that it is the present invention. But rather that the descriptions in FIGS. 1*a* & 1*b*, comprising the form and function, as well as what is disclosed in these teachings, are the present invention. Also, please note that the circuits are shown with only the main components, omitting support components for simplicity of presentation and clarity.

Figure 5A:
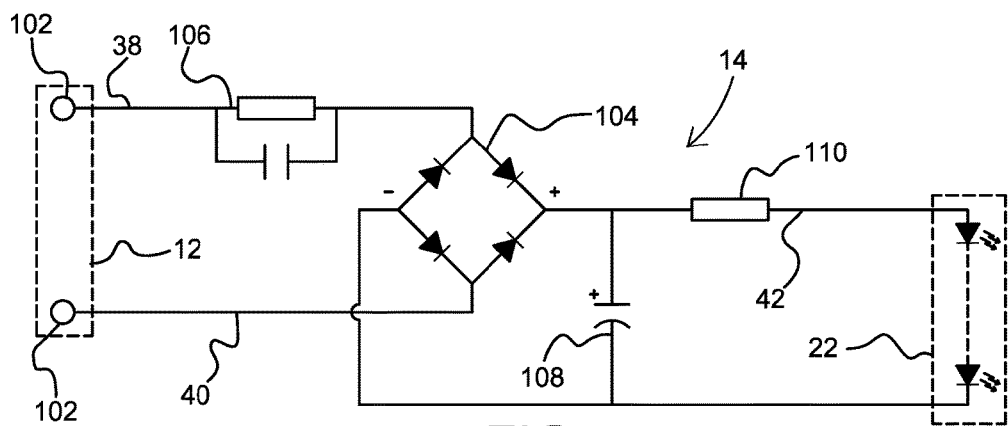
FIG. 5a is a schematic sketch of one possible configuration of the 230/120 VAC conditioning circuit 14 in FIGS. 1a and 1b, using a limiting resistor to control current, in accordance with an embodiment of the present invention.
Figure 5B:
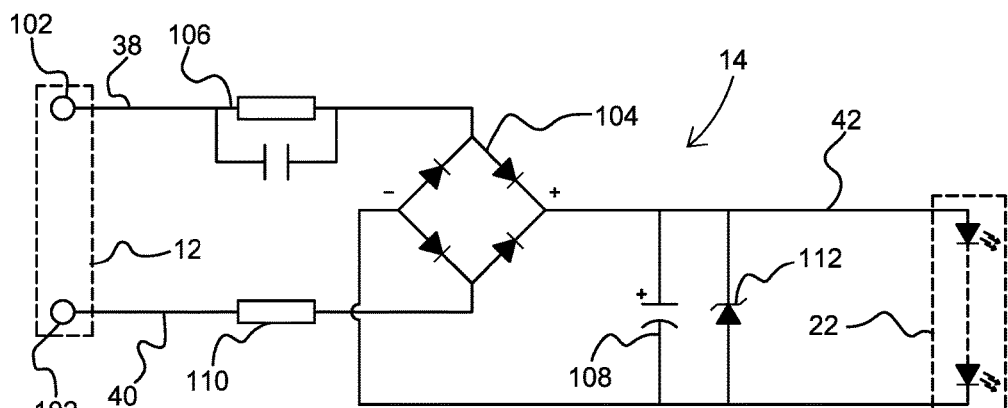
FIG. 5b is another a schematic sketch arrangement of FIG. 5a, configured with a Zener diode to control voltage, in accordance with an embodiment of the present invention.

Turning now to FIG. 5*a*, it is shown a typical 'transformer-less' 120/230 VAC conditioning circuit 14, having a full bridge circuit 104 and a limiting resistor/capacitor network 106 on the VAC side of the bridge, a filtering capacitor 108 and a limiting resistor 110 on the DCV side. The conditioning circuit functions to convert alternating current to direct current, and provides a suitable power supply to the (main 22 and strobing 24 & 25, 26 & 27) LED arrays. FIG. 5b is shown the addition of a Zener diode 112. In this configuration, the Zener diode 112 would limit the voltage, for example, to 69 volts, which is one way to 'step-down' and achieve the power supply required by the physical number of LED diodes in the lighting circuit 22, 24 & 25, 26 & 27.

Figure 5C:
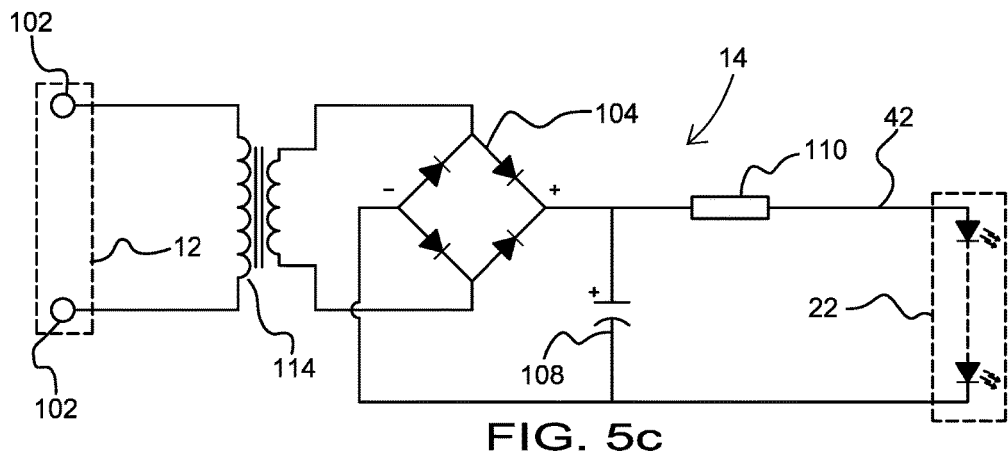
FIG. 5c is one more schematic sketch of a configuration of the 230/120 VAC conditioning circuit Block 14 in FIGS. 1a and 1b, using a step-down transformer, in accordance with an embodiment of the present invention.

Alternatively, FIG. 5c shows the same means as shown the FIGS. 5a & 5b, but with the use of a step-down transformer 114. Here the step-down transformer 114 would present to the bridge 104 a lower voltage before rectifying it to a DCV. Any of these 120/230 VAC conditioning circuits are suitable, but the present patent is not limited to just these examples, and that there are other configurations that would work equally as well.

FIG. 6 shows a similar function of FIG. 5c to suppling power, but here it is specifically to regulate the DCV for the systems electronic controls. In this example, it is shown that a step-down transformer 116, a full bridge 118, a fixed voltage regulator 120 (LM7812 Series), an isolation diodes 122a & 122b (1N4007 type), and a limiting resistor 124, all provide suitable regulation to; 1.) recharge circuit 18 for the battery 20, and 2.) supply operation DCV to drive the electronics 16. When line VAC is available, regulated DCV is supplied to positive terminal 126 via diode 122a, and is charging battery via limiting resistor 124. When the line VAC is not present, the battery 20, without any interruption, supplies the DCV via diode 122b to positive terminal 126. The battery 20 has a battery monitoring circuit 130. The battery monitoring would activate the chirp signal in the event the battery 20 should drop below a minimum threshold.

Although the step-down transformer 116, DCV regulator 120 and battery 20 can be of any suitable operating voltage, the preferred embodiment of the present invention it is in the 12 volts DC range, and, the battery is a rechargeable lithium ion battery. Please note that other voltages may be needed to function the apparatus 10. Such voltages may be 3 or 5 volts for some electronics. These voltages would be generated by a similar circuit that is disclosed here in FIG. 6.

As illustrated in FIG. 7a, the microprocessor control 28 would use the 3 or 5 volts as indicated in the previous paragraph and control most aspects of the apparatus 10 via receiving input from an input 132 'read process', and, drive control output from an output 134' write process'; utilizing program code specifically for these functions listed in FIG. 7a. A suitable microprocessor would be one of the Microchip Corporation, PIC series, such as their 8-pin, 14-pin or 20-pin models. Preferably one with built-in program memory, non-volatile memory and peripheral select ability, even one with communication means. Each of these models can be programed, by any one skilled in the art, to produce the function describe throughout this disclosure referencing the apparatus of the present invention 10, controlling the various circuits as indicated in FIG. 1a.

In FIG. 7b, the results are similar to the results described in FIG. 7a, but using discrete electronic components operating in logical manner. Here the power control 66, operating on system DCV power (see FIG. 6) via terminal 126 & 128 to receive an input 138 and drive an output 140. The power control would produce the function describe throughout this disclosure referencing the apparatus of the present invention 10, controlling the various circuits as indicated in FIG. 1b. Those skilled in electronics would be able to assemble such discrete components configured to operate and function as described. It is highly desirable to miniaturize all said circuits indicated in both FIGS. 7a & 7b, and as such the use of an ASIC (Application Specific Integrated Circuit) is most useful. The inventors would employ such ASIC technology into the present invention apparatus 10, substantially reducing the component count, when designing a particular end use device. This would further reduce power consumption extending operating time when VAC Line power is not available.

Figure 8A:
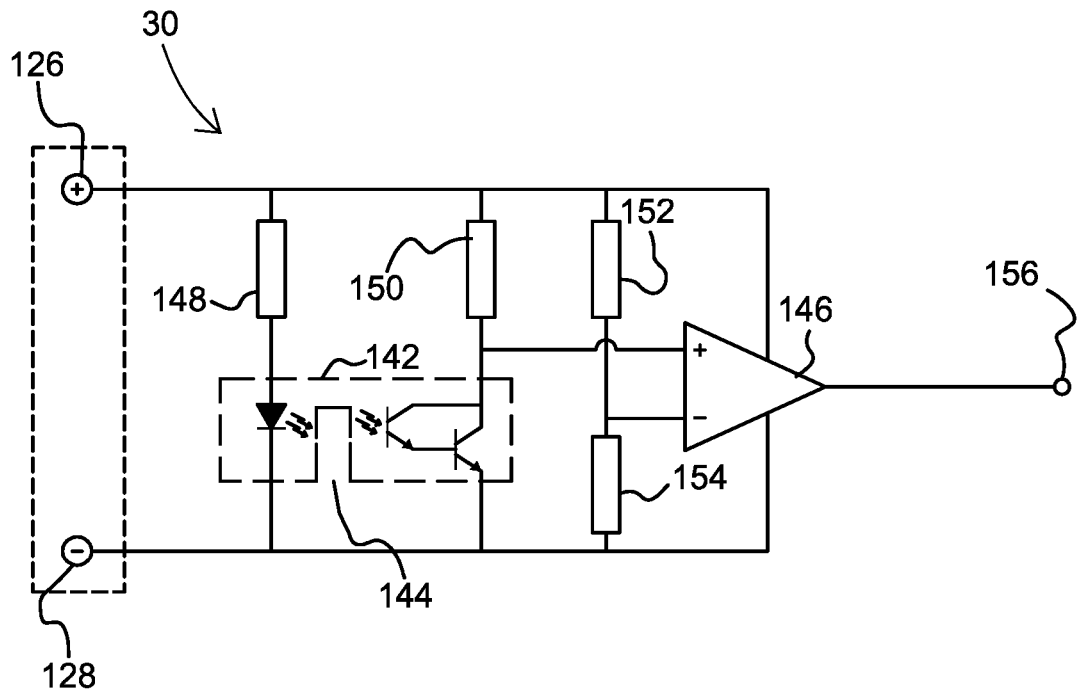
FIG. 8a is a schematic sketch showing electrically the smoke detection process, in accordance with an embodiment of the present invention.

Turning next to FIG. 8a, where it is disclosed a schematic sketch showing electrical side of the smoke/carbon monoxide/gas detector(s) 30 sensing elements of the present invention. A photo-interrupter 142, a signal condition means 146, a current limiting resistors 148 and 150, and a signal balancing resistors 152 and 154. The photo interrupter 142 smoke detecting sensor, having a smoke entry port 144, for the entry of smoke when it is present. The limiting resistor 148 restricts current flow in the emitting diode within the sensor 142, likewise, the limiting resistor 150 restricts current flow within the 'darlington' photo transistors of the isolated output of the device 142.

The sensor 142 can be of any smoke detecting means, either reflective or transmissive, but the preferred embodiment is a Sharp Microelectronics, PN# GP1L52VJ000F transmissive device. When smoke is detected the amplified darlington output of the sensor 142 changes the current flow to the plus input of the signal conditioning means 146. In this example of a detecting circuit, operational amplifier is a conventional LM741 type amplifier, that can then go directly to the audible and LED strobing circuits (that will be described later) via 156. If a microprocessor is use, as it in FIG. 1a, the darlington output of the sensor could directly be seen as a peripheral, and have no need for the amplifier circuit 146 device.

Figure 8B:
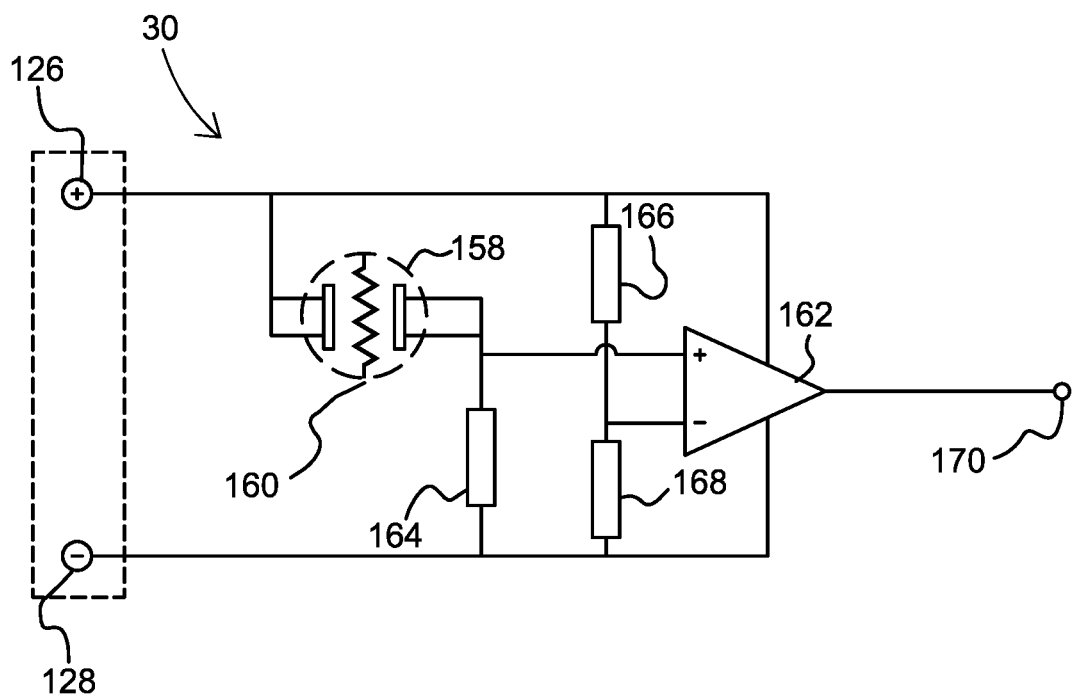
FIG. 8b is a schematic sketch showing electrically the carbon monoxide detection process, in accordance with an embodiment of the present invention.

Similar to FIG. 8a circuitry, in FIG. 8b a carbon monoxide/gas sensor 158 having a measuring resistance surface 160, a signal conditioning means 162, a limiting resistor 164 and a signal balancing resistors 166 and 168 are connected electrically for such purpose of detecting CO & gases, and, having an output 170. Again, any CO, ionization gas sensor would work but the preferred device would be the MQ-7 Gas Sensor manufactured by Hanwei Electronics Co., LTD. An electro-chemical means can be utilized to specific target for gas types, in a more exotic application of the present invention.

It is explicitly understood that the present invention 10, can have either one of the smoke, carbon monoxide or gas sensors, or, any combination or all such sensors incorporated into a single device of the apparatus 10. Also, the components shown in the FIGS. 8a & 8b are just representative to show intent of the main components, and, other supporting circuitry is intentionally not show for the clarity of presentation. Any one skilled in the art of electronics could appreciate the inventor's disclosure of the present invention and understand its meaning.

Figure 9:
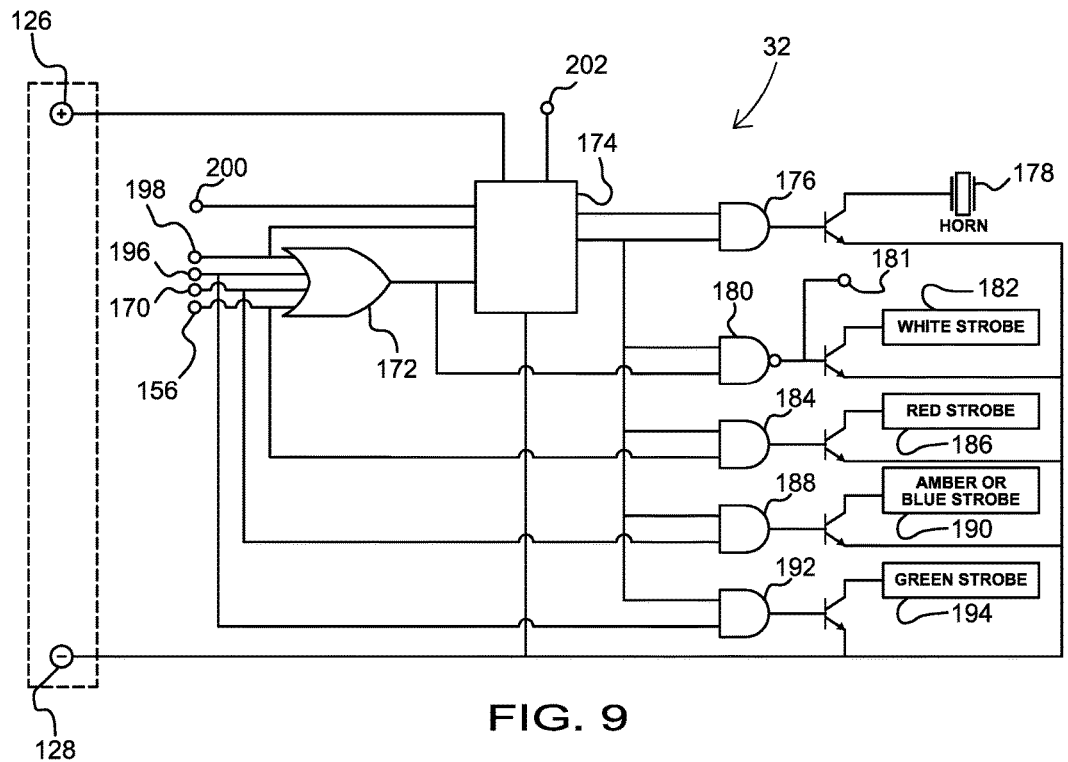
FIG. 9 is a schematic sketch showing electrically the timing management of various signals that create the controlling waveforms of the present invention including the out driving circuits of sound and strobing LED's, in accordance with an embodiment of the present invention.

Now in FIG. 9 is shown the audible/visual alarm 32 control. An 'OR' logic gate 172, a timer/counter circuits 174, an 'AND' logic driver circuit 176, a piezo electric horn 178, a 'NAND' logic driver gate 180, an 'AND' logic driver gates 184, 188, and 192, a high intensity white LED's 182, a high intensity red LED's 186, a high intensity amber or blue LED's 190, and a high intensity green LED's 194. The 'OR' gate receives signals: smoke detected signal active 156, carbon monoxide/gas detected signal active 170, repeat alarm signal active 196, and low battery signal active 198. Any of the four signals presented to the 'OR' gate 172, would output a logical high to activate the timer/counter circuit 174, which in turn would signal the driver circuits 176, 180, 184, 188 and 192. The driver circuit 176 would output to the piezo electrical horn 178, while the other driver circuits would strobe the LED's 182, 186, 190 and 194 (referred to a blocks 24, 26, 27 & 25 respectively in FIGS. 1*a* & 1*b*).

The color of the LED circuits would depend on which of the signals received at the 'OR' gate 172. That is, smoke detected signal active 156 would also be at the red 'AND' driver circuit 184, carbon monoxide or gas detected signal active 170 would also be at the amber or blue 'AND' driver circuit 188, and the repeat alarm signal active 196 would also be at the green 'AND' driver circuit 192. The white 'NAND' driver circuit 180 would be inverted from the other colored LED 'AND' driver circuits, creating a pattern of white lighted strobing LED's, in between a colored strobing LED's. This pattern will be fully detailed later in a waveform section of this disclosure.

The white 'NAND' driver circuit also outputs a main array strobe signal 181. As will be disclosed is FIG. 13, the main array strobe signal (connected to the gate of an SCR switching device) will interrupt the lighted main array 22 if powered; causing it to strobe in unison with the colored arrays described earlier. An activate microphone signal 202 is generated via timer/counter circuit 174 and sets the timing in which the microphone will listen for the silence command as is referenced on FIG. 10 (also see waveforms of such timing in FIG. 12). The low battery signal active 198 is generated from the battery monitoring circuit 130 referenced on FIG. 6, and when is active, the horn 178, with white strobe LED's will 'chirp', or be ON for a very short amount of time to indicated a low battery state.

Figure 10:
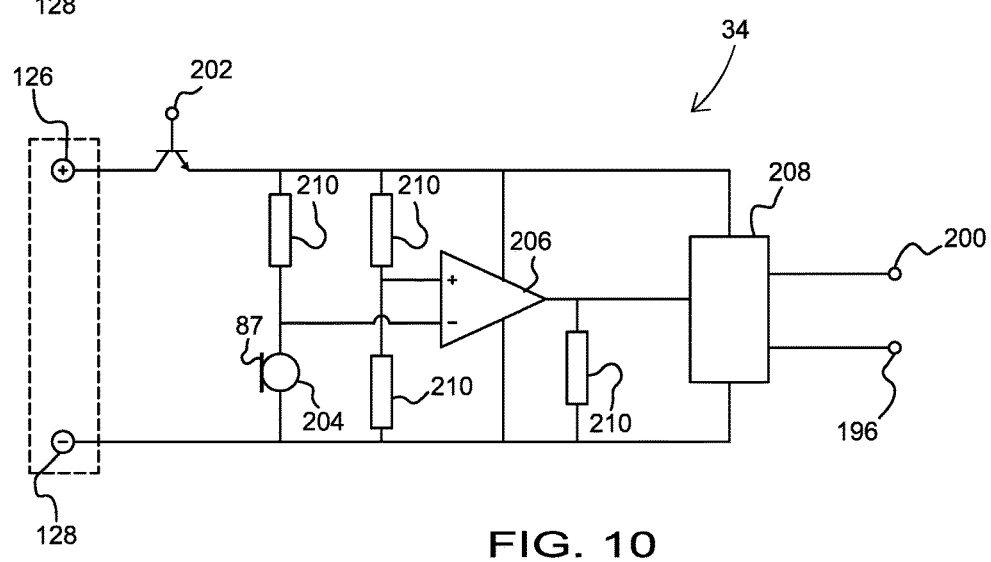
FIG. 10 is a schematic sketch showing electrically the silence circuit and the microphone control, in accordance with an embodiment of the present invention.

FIG. 10 is the silence circuit 34 having an activate microphone signal 202, a condenser microphone 204, an operational amplifier circuit 206, a counter/divider circuit 208, a supporting circuit resistors 210, a silence alarm signal active 200, and a repeat alarm signal active 196. When a signal is present at switching device; activate microphone signal 202, will power the listen capability of the silence circuit 34. Any audible sounds within range of the condenser microphone 204 is present to the operational amplifier 206.

When the signals, from the microphone, meet the predetermined amplitude level as is set forth via the supporting circuit resistors 210, the operational amplifier would output such a signal, for the duration of the said signal above predetermined amplitude level; to the counter/divider circuits 208. If there are two such predetermined amplitude level signals, generated within the window of time presented by the activate microphone signal 202, then, the counter/divider circuits 208 would output a valid silence alarm signal active 200.

Referring to FIG. 9, the silence alarm signal active 200 is seen via the timer/counter circuit 174, whereby the alarm state is suspended, for example one minute. Referring back to counter/divider circuits 208, a repeat alarm signal active 196 is generated when operational amplifier circuit 206 sees a pattern of meeting the predetermined amplitude level in three consecutive beats in three alarm cycles.

When the apparatus 10 of the present invention is in a quite or quiescent state, the timer/counter circuits generate a very short activation of microphone signal 202. If no predetermined amplitude level is seen by the counter/divider circuit 208, the activate microphone 202 is immediately shut OFF. But if a single predetermined amplitude level is present at 208, then the circuit 202 stays active and will listen for the aforementioned three consecutive beats in three alarm cycles. This would have indicated that a nearby, other apparatus 10 within range, was alarming, and, the repeat alarm signal would be generated via counter/divider circuits 208 at output 196 repeat alarm signal active. This activation would drive the green LED's 194, on FIG. 9. These functions described in FIGS. 9 and 10 will be better appreciated and be more fully detailed in the following state and waveform sections of this disclosure.

A suitable counter/divider 208 would be a CD4017 and operational amplifier 206 would be a LM741 and are both manufactured by Texas Instruments. A suitable condenser microphone 204 would be a CME-5042PF-AC, manufactured by CUI, Inc.

Again it is important to remember, if a microprocessor 28 is employed (as is described in FIG. 1*a*), then many of these discrete circuits are handled in software; reducing the component count and operating power consumption.

Figure 11:
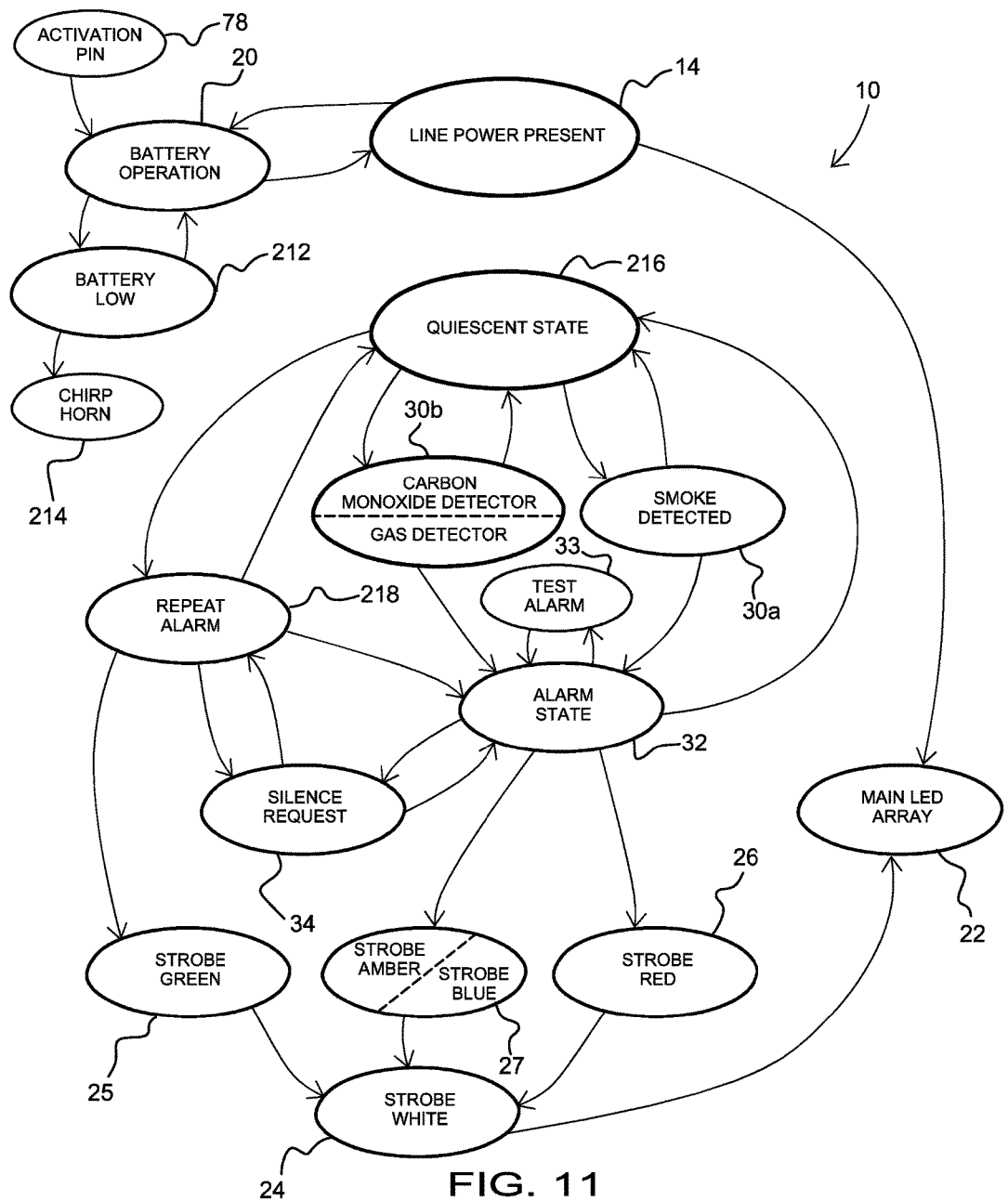
FIG. 11 is a state table, illustrating the various possible operating modes the apparatus can be in, and how it navigates between states, in accordance with an embodiment of the present invention.

FIG. 11 references a state table, which discloses the operation of the apparatus 10. Here, the activation pin oval 78 (as referenced in FIGS. 3 & 4) is disengaged from activation means 98, and, bringing to life the system via the rechargeable battery 20. Activation means 98 in the preferred embodiment is a surface mounted switch that will toggle ON when the pin is removed. The activation is depicted by the arrow flowing from oval 78 to oval 20. It is important to understand that the pin 78 cannot be re-engaged to deactivate the battery powering of the system 10.

Referring again to FIGS. 3 and 4, the ribbon 80, physically attached to pin 78 and mostly covering the electrical connection means 12, prevent the apparatus 10 from being installed for its purpose, without first removing the pin 78. And thus, apparatus 10 is always activated via battery 20 before going into service. Should the battery 20 be low in stored energy, the apparatus 10 will enter a battery low state 212, and issue a 'chirp' signal 214 that will be delivered to the audible alarm oval 32 (as referenced in FIGS. 1*a* & 1*b*). The arrows flowing to and from the battery operation 20 and battery low 212 are indications that this state is constantly monitored via battery monitoring circuit 130 in FIG. 6. The arrow flowing to the chirp oval 214 is an indication that the battery is low.

When the apparatus 10 is installed into service, (such as the Edison socket configuration, electrical connection means 12, being screwed in a lamp—see H-A in FIG. 2*a*), and, the lamp is turned ON, the 230/120 VAC conditioning circuit 14 would enter a line power present state as depicted in oval 14. The system would be now powered via VAC line current as arrows indicate flowing to and from the line power present oval and the battery operating oval 20. Further, the LED's on in the main LED array will illuminate; as depicted by the flow arrow to the main LED array oval 22. The LED's in the main array 22 will stay illuminated as long as there is available 230/120 VAC line power present.

The electronics is active and is monitoring all states of operations as follows. A quiescent state 216 oval is the 'normal' state. If the apparatus 10 is not in a normal quiescent state, it would be in an alarm state by smoke detected and/or carbon monoxide and/or gas detected (ovals 30*a* & 30*b*) or a repeat alarm state 218. The flow arrows to and from said ovals indicate the apparatus 10 being in such states respectively, and would deliver to the alarm state oval 32 that an event occurred and would sound the audible horn.

Further, the strobe red LED's 26 and/or strobe amber or blue LED's 27 ovals, are intermittent with strobe white LED's (24 oval). The red LED's 26 are a visual alarm that smoke is present, while the amber or blue LED's 27 indicates carbon monoxide (blue for gas) was detected. The intermitting of the red or amber or blue with the white LED's 24 strobing, give rise to exactly the type of danger that is present and causing the alarm. As was discussed earlier in FIG. 9 (and will be further detailed in FIG. 13), when VAC line power is available, the strobe white LED's (oval 24) signal the main array 22 to strobe as well; as indicated by the flow arrow between ovals 24 and 22

The repeat alarm state oval 218, can also activate the alarm state oval 32. This is achieved in one of two ways: 1.) with RF communications circuit 36 (as referenced in FIGS. 1a & 1b) is present, or 2.) listening via the on board microphone 87/204 (see FIG. 10) for an audible alarm pattern. The audible alarm pattern will be more clearly understood in the waveform disclosed in FIG. 12. Either way, via electronic RF communications 36, or, of the listening for an audible alarm pattern, the repeat alarm state on oval 218 will trigger the alarm state 32 and strobe green LED's (green oval 25) intermittent with white strobing LED's (oval 24).

Those skilled in the art will recognize that the significance of the red and amber or blue strobing LED's, or, the green strobing LED's are important to understand. When either the red, amber or blue are strobing, that means extreme danger of the smoke or carbon monoxide or gas was detected local to that apparatus 10, and, when these red, amber or blue visual alarms (LED's 26 & 27) are seen, a user should exit in the opposite direction from the unit being that a high degree of danger is present. The repeat alarm (oval 218) unit, being a second apparatus 10 within either communications or listing range but not physically in smoke or carbon monoxide or gas environment, gives green strobing LED's 25 to indicate a possible safer exiting route, e.g., sound the audible alarm to give rise to the emergency, and, the green visual strobing indicates that no smoke or carbon monoxide or gas is present at said second repeat alarm location. Should smoke or carbon monoxide or gas migrate to the second apparatus 10 location, the green LED's would turn to red or amber or blue, as the case may be as detected by its own on-board detector(s) 30 (30a, 30b or 30c respectively).

In some embodiments, a test alarm 33, mode is entered via oval 33. This is accomplished by turning the apparatus ON/OFF/ON (switch the available 120/230 VAC line power) in quick succession, within one second to activate a test alarm mode. Both the audible and visual alarming means will activate in the test alarm state and will last for five second, for example, or, be silenced via a silence command response via oval 34. There is a system wide network 'query' test procedure that will be discussed later in the base-station disclosure of the apparatus 10.

Looking now at FIG. 12a, where it is shown a waveform mapping a possible results generated from various states of operation in FIG. 11, there is an alarm cycle waveform 220, an audible pulsation waveform 222, a colored LED strobing waveform 224, a white LED strobing waveform 226, a silence window waveform 232, and a valid silence commend detected waveform 230. Referring to FIG. 11, when entering either the smoke detected or carbon monoxide/gas detected ovals 30a or 30b, triggers alarm state 32; represented here as 220 waveform. In the audible pulsation 222 waveform of the horn, there are three pulses (beats) for each alarm cycle 220, as well as three strobing of colored (red 26 for smoke or amber/blue 27 for carbon monoxide or gas, or, green 25 for no smoke, carbon monoxide or gas detected) LED waveform 224. The alarm cycle 220 also has two strobing white LED waveform 226 of-set with the colored waveform 224. In such a manner, there is an alternating patter to the colored and white LED's arrays 24 and, red 26, or, amber or blue 27 for danger; green LED's 25 for repeat mode, as indicated in FIGS. 1a & 1b.

The silence window waveform 232 shows the interval of time between the horn in the alarm 32 being silenced, so the microphone 87/204 can listen. The valid silence command detected waveform 230 shows that a command to SHUT OFF has been generated and recognized (this function will be discussed in FIG. 12b). Note that the audible pulsation 222, and colored and white strobing LED's 224 & 226 have ceased at the exact moment the trailing edge of the second valid silence command detected waveform 230. This moment the alarm turns OFF, time-OFF 228 will suspend the alarm state, for example one minute (as seen in FIG. 11, ovals 32 and 34). If the detected smoke or carbon monoxide or gas has not cleared the detectors 30a or 30b, then the alarm state will re-establish alarming again as indicated above.

Moving to FIG. 12b an audible signal generated within the silence window 232, shows what a spurious noise (background) detected waveform 234 looks like. In the next silence window 232, a possible real command signal waveform 236 shows a first silence recognition waveform 238, and, a second silence recognition waveform 240; both signals being above the required amplitude threshold 242 predetermined amplitude level. Two separate signals, represented as references 238 & 240, must occur within the time that a silence window 232 is open and listening. It is the two distinct signals that form the required 238 & 240 waveforms, that produce the valid silence command detected waveform 230 (via input to amplifier circuit 206 in FIG. 10 meeting required threshold level established by the resistors 210).

It should be understood that the user of the present invention of apparatus 10, would verbally command using speech "SHUT OFF" within the listing range of the microphone 87/204. Further it is understood that any like command having two sharply formed words, such as BE-STILL, QUI-ET, SHUT-UP, etc., or even two 'snapping' of one's fingers sharply could produce the required valid silence signals 238 & 240, resulting in the command pulses 230 to be silent. If there are just one pulse, or if there are three or more pulses, achieving the amplitude threshold 242 level, within a silence window 232 (as determined via counter/divider circuit 208 in FIG. 10 would not output silence signal 200), it would be considered invalid and the alarm would not turn off. These timing waveforms are all generated via the circuits in FIGS. 9 & 10, initiated via the smoke and/or carbon monoxide and/or gas detectors in block 30 of FIGS. 1a & 1b.

In FIG. 12c, it is shown a repeat alarm waveform 244, a time-ON 246 moment alarm is detected waveform, and an audible alarm detected pattern waveform 248. The following scheme is used in the sound only embodiment, i.e., the embodiment does not include RF communication means. Referring to FIG. 11, the repeat alarm 218 oval constantly listens for the pattern in waveform 248. It accomplishes this by briefly turning ON the microphone 87. Should there be just spurious background noise, like is seen on waveform 234, then the microphone would turn back OFF (saving energy) until the next time to listen is programed.

If there is a sound that has sufficient signal amplitude to meet the threshold 242 predetermined amplitude level, the microphone 87 would stay ON and listen. If a pattern persists of alarm pulsation waveform 222 three times consecutively, then the apparatus 10 would enter an alarm state 32 at time-ON 248. The repeat alarm being activated, means that another apparatus 10, within listening range, has alarmed and in an alarm state. The repeat alarm function (referring to FIGS. 9 & 11), would strobe green oval 25 with white oval 24. It is in this way that all such apparatuses 10 can network throughout a structure, such as a home, in just seconds.

Further the microphone 87 would continue to listen, in the periods of the silence window 232. If there are no further sounds meeting the threshold amplitude level 242, then the repeat alarm signaling of audible 222 and green strobing 25 alternating with white strobing 24 LED's would automatically stop. As was earlier mentioned, and referring to FIGS. 1a & 1b, if the apparatus 10 is equipped with the manufacturing RF communication circuit 36 option, then the apparatus 10 would transmit and receive T/R its state and status via RF signaling; and not just rely on the microphone 87, 204. The sound means is useful for networking between lesser functional apparatuses 10 that would not have the RF communications means installed.

Figure 13A:
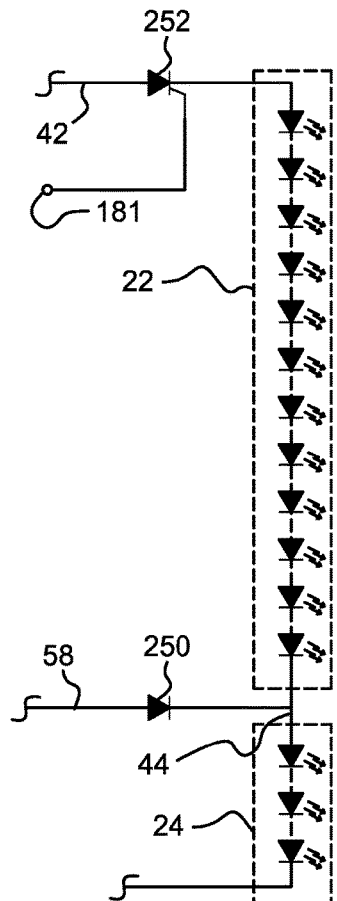
FIG. 13a. is possible LED array circuit diagram showing Blocks 22 & 24 from FIG. 1 and configured in a serial arrangement layout, in accordance with an embodiment of the present invention.
Figure 13B:
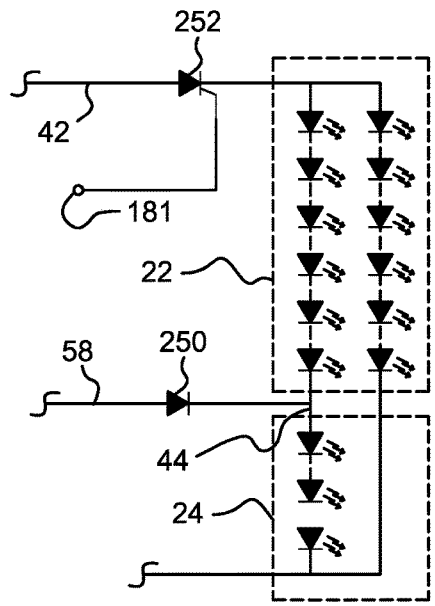
FIG. 13b is another possible LED array circuit diagram showing Blocks 22 &24 from FIG. 1 configured in a serial and parallel arrangement layout, in accordance with an embodiment of the present invention.
Figure 13C:
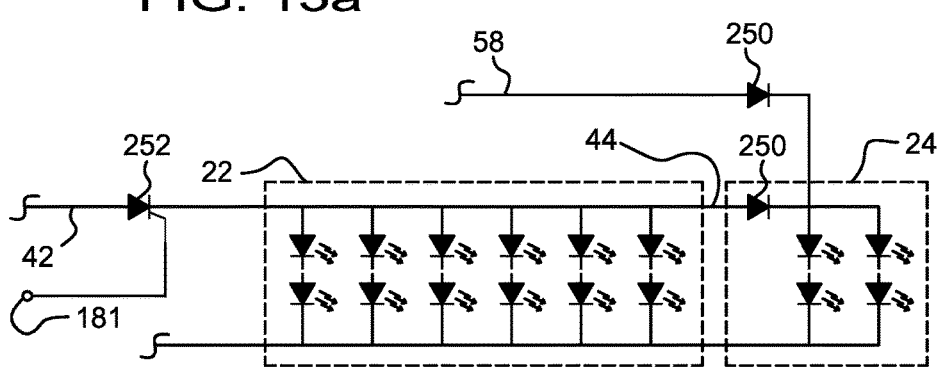
FIG. 13c is yet another possible LED array circuit diagram showing Blocks 22 & 24 from FIG. 1 configured in a serial and parallel arrangement layout, in accordance with an embodiment of the present invention.

In FIG. 13 is shown three conventional layouts of LED arrays. FIG. 13a shows a serial arrangement of the main white LED array 22 (referring to FIGS. 1a & 1b), and, FIG. 13b and FIG. 13c show a combination of serial and parallel design of main array 22. The white LED's in the strobing LED array 24, in the present invention, have a dual purpose when 1) powered by line 42, the array 24 operates as a normal light, e.g., steady ON giving illumination, and 2) operated as a strobing white light during an alarm state if on battery power. This is achieved via power provided on line 58.

A steering diode 250 prevents voltages present on line 44 back through the diode 250, thus when power is available on line 42, no other circuits are effected. Likewise, when the strobing power is present on line 58, the LED array 22 is not effected or illuminated; by the unidirectional nature of diodes only allowing current to flow in one direction, isolation between these arrays are achieved. When the apparatus 10 has VAC line power available, and the main array 22 is ON, a silicon controlled rectifier (SCR) 252, would interrupt the steady-state ON of the main array 22.

The effect of the SCR 252, being controlled by the main array strobe signal 181 (as referenced in FIG. 9) would cause the main array 22 to strobe in unison with the white and colored LED arrays as mentioned earlier when the apparatus 10 is in an alarm state. It is important to understand that the main white LED array 22 will strobe only when VAC line power is available, along with the white strobing array 24, and, the smaller white strobing LED array 24 is only strobing during battery operation; when VAC line power is not available. This conserves energy while still giving a visual alarm during an alarm state.

It is noteworthy to say that the layouts in FIGS. 13a, 13b & 13c are just examples, both in configuration and number of LED's in any of the circuits. There are too many variables in the manufacturing to list them all. Therefore, the inventors explicitly underscore the actual number of LED's used, and their layouts are dependent on the engineer's choice of available LED's, the form of VAC conditioning (as is shown in FIGS. 5a, 5b & 5c), and, the end use of the present invention 10, i.e., the Edison A-19 lamp housing (H-A) in FIG. 2a, the recessed housing (H-D) fixture in FIG. 2d, the nightlight housing (H-E) in FIG. 2e, etc.

Each of these housing types would use different considerations in the number of LED's, the layout of LED's and the circuit's form as shown in FIGS. 5a, 5b, and 5c. There are many suitable manufactures of both the white and colored LED's, (such as Cree, Lumileds, Osram, Vishay and Avago to name a few) offering hundreds of varieties. Anyone skilled in the art, could select a quantity of LED's and a circuit layout, along with VAC power conditioning that is ideal for any given LED choice; to result in a functioning apparatus 10 of the present invention.

In operation, the present invention for an improved LED light bulb apparatus 10 incorporating a smoke detector means, a carbon monoxide detector means, a gas detector means (any one or all such means) 30, into a bulb envelope housing H-A, H-B, H-C, H-D or H-E, while maintaining substantially the standard style and shape or form of the conventional light bulb housing. The housing, of any style/type/shape of conventional light bulbs, lighting fixtures or lamps; making the improved apparatus 10 disclosed herein, easily a direct replacement for any prior art devices preexisting. Said housings will have partitions 88 & 90, separating areas of the internal spaces. Typically, there are three such spaces; a LED light interior 82, an electronics chamber 84 and a detector/microphone/horn space 86.

The powering circuits can be configured to any particular design need that can use a transformer-less layout as in FIGS. 5a & 5b, or, the use of step-down transforms as in FIG. 5c. The design needs being a consideration for the end use of the present invention in any given application.

The improved LED light bulb apparatus 10 having an audible pulse emissions 222 means, that in an alarm state would pulsate. Such pulsation can be rhythmic, for example 3 beats ON and 1 beat OFF for an alarm cycle 220. This audible pattern is intended to give urgency. Further the audible/visual alarm circuit 32 has high intensity white 24, and, high intensity color (such as RED 26) LED's that strobe alternately ON while in an alarm state 220. Such strobing makes a visible alarm 224 that matches the pulsation of the audible alarming.

In some embodiments, a silencer circuit 34 listens (via microphone 87), between the audible pulse emissions (silence window 232). If it hears two sharply structured reverberations 238 & 240, such as in someone shouting the words "SHUT OFF" (or the alike) within a brief window of time 232, the device would suspend the alarm state 228, for example one minute. If the air was not cleared after that period of suspension of time, the alarm would continue. The user could tell it to shut-off again until all air is clear.

The same microphone 87 listening device 204 mentioned above, would listen for audible alarm patterns of sound 222, and if detected three consecutive times (222) in three alarm cycles 220 would repeat the alarm 246; thereby creating a network of two or more like apparatuses 10 of the present invention (like in function, not housing type or style).

In the manufacturing of the apparatus 10, the non-removable, rechargeable battery 20 power is shipped in a dormant state until the end user would cause a 'one-time' activating means 98 (by removing pin 78) to initialize the electronics at instillation. The apparatus' electrical connections 12 are partially cover with ribbon 80, making it impossible to install the device without first removing the pin and ribbon. The rechargeable battery, will keep alive all necessary circuitry during periods when VAC Line power is not available. The battery 20 is always kept at peak capacity when the line voltage is present, and therefore is ready to cover periods when the VAC line voltage is OFF.

Battery operation is restricted via circuitry 66 by selectively powering the apparatus of the present invention while it is in a 'quiescent' state 216. That is, a state where the apparatus is not in an alarm state 32, and therefore can power-down unneeded drains on battery 20. If the battery does experience a drop in stored energy, a low battery is sensed via monitor 130 and would enter a low battery state. Appropriate notification via a pulse to the horn 178 would 'chirp' 214. That is, emit a very short duration pulse of sound, for example once per minute.

To correct this low battery situation, the user would simply 'turn-ON' the light apparatus 10 by making the VAC line power present to the system and recharge the battery 20 via circuits in FIG. 6. This would sufficiently re-charge the battery and chirping would immediately stop. It is understood that the microprocessor 28 could better control universally all aspects of operation of the present invention with respect to managing power consumption. Also that an ASIC (Application Specific Integrated Circuit) would greatly help in miniaturization of the electronics, as well as the efficiency of power use.

The present invention for an improved LED light bulb apparatus 10, can communicate 36 via short range radio frequency (RF) signaling, that an alarm was activated. The present unit, detecting the alarm situation via 30, would alternate pulsing of high intensity white and red (or amber or blue) LED's for the visual signal, and the audible pulsation mentioned above. While, any other like (in function) improved LED light bulb 10, within range of the present unit, but not in the smoke or carbon monoxide or gas environment, would repeat alarm (waveform 246) with an audible and visual signaling of its alarm.

In this case however would not present the red, amber or blue LED pulsating, but use the green high intensity LED's; until or when it also detected the smoke, carbon monoxide or gas. The green LED's pulsing with the white here would indicate a possible 'safer' escaping route for the user of the apparatus. Thus, such an apparatus 10 would give direction as to possible safer exiting away from the danger. During silence window 232, the repeat apparatus 10 would listen for any sound meeting the amplitude threshold 242, and, if hearing none would stop the repeat alarming both audibly and strobing white and green LED's.

In a scenario of how a home, with the present invention of an improved apparatus 10, is installed in every room may unfold: A user occupant in a center room of a long hallway and having a base-station in it, with laundry room and garage at one end, and kitchen and living room at the other; is awakened in the middle of the night via the base-station alarming that there is smoke in the laundry room. With the sound of the detectors blasting from every direction (because of the repeat feature of the apparatuses 10), the occupant opens the door and seeing in the hallway, a 'nightlight' flashing green & white strobing light, would enters the hallway.

Looking to the laundry room/garage end direction, sees flashing red & white strobing light. The occupant turning to the other direction, at the kitchen/living room end of the hallway, sees flash green & white strobing light, and would know that a fire (red light) was at the garage end of the house, and would appropriately exit the home in the direction of the green strobing light (safer environment) end. The color 'green' strobing light giving a clear exiting path out to safety.

However, in the case of a 'false' alarm, as would be if something burning on the kitchen stove; and the kitchen apparatus 10 alarms appropriately signal with red & white strobing. The other apparatuses 10 throughout the home soon triggers with a 'repeat', green & white strobing alarm state. The occupant simply would remove the burning pot from the stove (open a window) and verbally command the kitchen apparatus 10 to "SHUT-OFF." The unit immediately stops sounding the alarm (at the recognizing the command); following soon, the other units throughout the home, that are in their repeat state of alarm, would also stop alarming. The suspended alarm state in the kitchen unit would alarm again if the smoke was not cleared.

The apparatus 10 of the present invention takes advantage of all these objectives by directly replacing a conventional light bulb, configured in any conventional style or shape, with an improved LED light bulb incorporating a smoke detector, carbon monoxide detector or gas detector, and, transmitting/receiving RF signals with an annunciating base-station (that will be fully disclosed later) that always gives the current state of the network of apparatuses in the structure; by having a non-removable rechargeable battery always available and ready to alert in both audible and visual strobing pulsations, and, can be silenced by simply telling it verbally to SHUT OFF; using any two sharply structured reverberations (words/syllables) in a sequence of speech sounds.

The improved device would be configured to all existing lighting lamp configurations, making them easy to replace existing conventional lighting and thus make it easy to up-grade the home or building to a higher level of self-assurance. The disadvantages of prior art listed earlier are all overcome and the user of the present invention can remove older independent smoke, carbon monoxide and gas alarming devices that require constant replacing of batteries, and are subject to annoying false triggering of the alarm, that cannot be silenced conveniently, e.g., removing of the its battery. The improved LED light bulb apparatus of the present invention uniquely solves problems that prior art cannot.

Figure 14:
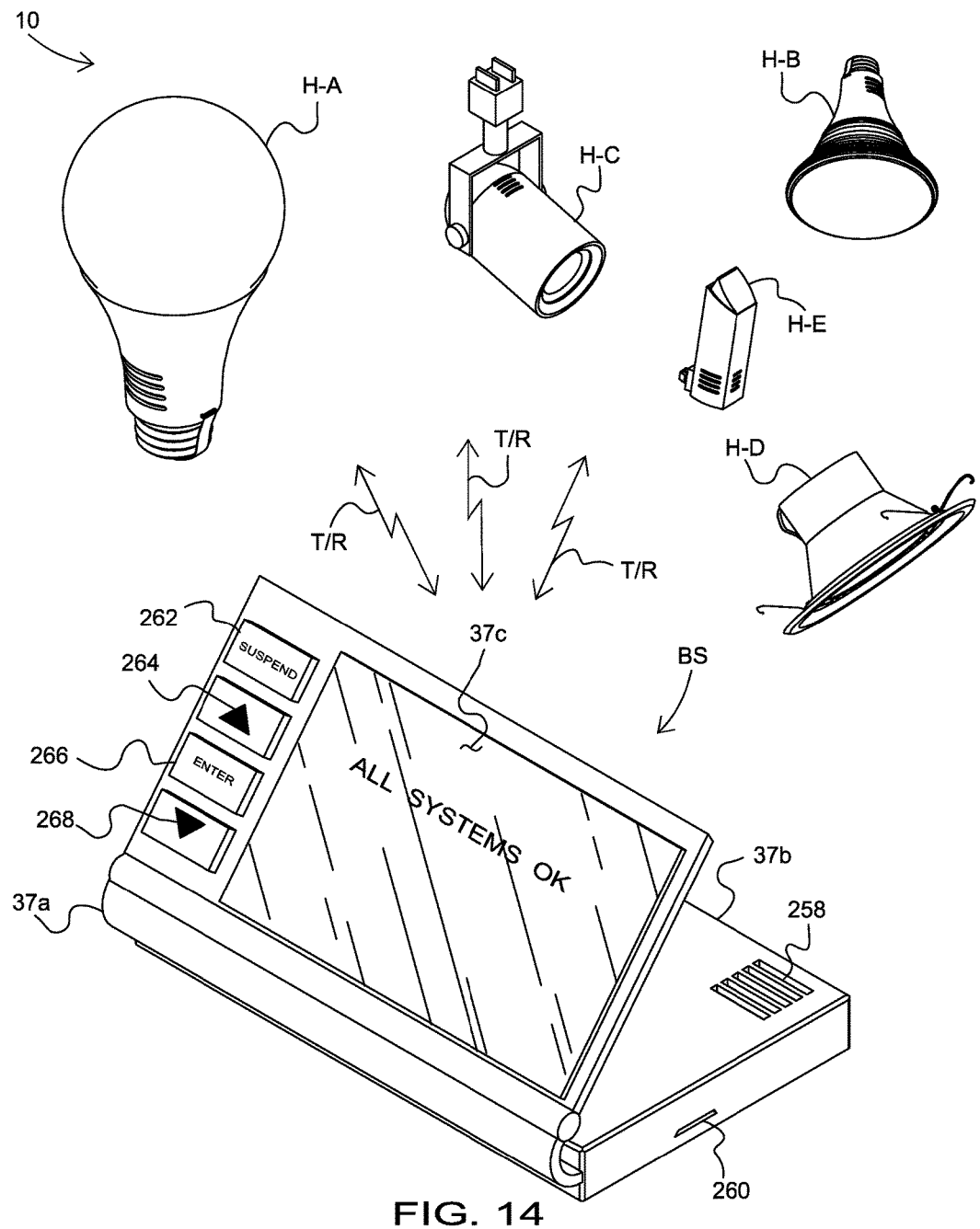
FIG. 14 is an illustration of the base-station features, and, connectivity means with individual improved LED light bulb alarming apparatuses, in accordance with an embodiment of the present invention.

Now to further understand networking of the system, we turning next to FIG. 14 where it is illustrated, a base-station BS for the present invention to communicate with the individual, improved LED light bulb alarming apparatuses 10, in comprising a network. Base-station BS features a base-station electronics 37*a* section, a base-station power circuit 37*b* section, and a base-station display & control 37*c* section. The base-station electronics 37*a* has a speaker 258 and a USB Comm. Port connections 260 means. The base-station electronics 37*a*, has base-station power circuit 37*b* incorporated within (not shown in FIG. 14), comprising of a rechargeable battery and VAC line power to DCV via a transformer module connection (also not shown).

The battery operations of the base-station BS, makes it portable, and thus, be carried about the home/building for programing purposes which will be discussed later. The base-station electronics 37*a* further has short-range RF communications means. In the preferred embodiment, the base-station communication means is of the Bluetooth technology and compatible with all apparatus 10 devices. It should be understood that other RF means, such as ZigBee or 'smart' appliance communication techniques could work equally as well. This communication is indicated by the transmit/receive signal arrows T/R referenced in the FIG. 14, and, are shown to be with the listed H-A, H-B, H-C, H-D & H-E apparatuses 10, comprising a network of the present invention devices.

Also, the base-station BS can 'listen' via a microphone for an alarming pattern waveform of sounds disclosed earlier, and are manufactured into a lesser sophisticated model of the apparatus 10, not having incorporated into it, a comm. circuit 36 (as referenced in FIGS. 1*a* & 1*b* of a co-patent by the inventors).

The base-station display & control 37*c* section, has a 'suspend' pushbutton 262, a menu 'up' scroll arrow pushbutton 264, an enter/select pushbutton 266, and a menu 'down' scroll pushbutton 268. Using the scroll 'up' and 'down' arrow pushbuttons 264 & 268, along with the enter/select pushbuttons 266, will allow navigation through the base-station BS various menus (a more detailed description of the menu system will be disclosed in FIG. 17). The 'suspend' pushbutton 262 will immediately suspend any alarming apparatus of the audible alarm, for example, one minute. If the danger is still present after the suspended period of time, the system will sound again. The base-station microphone can also listen for verbal commands, such as SHUT-OFF when spoken to it within close range, as was disclosed in the 'silence command' discussion of the apparatus 10, earlier in the patent. Both the 'suspend' pushbutton 262 and the silence command feature (verbally spoken by speech) via the listening of the base-station microphone built-in to the base-station electronics 37a, are useful when encountering a false alarm situation.

Figure 15:
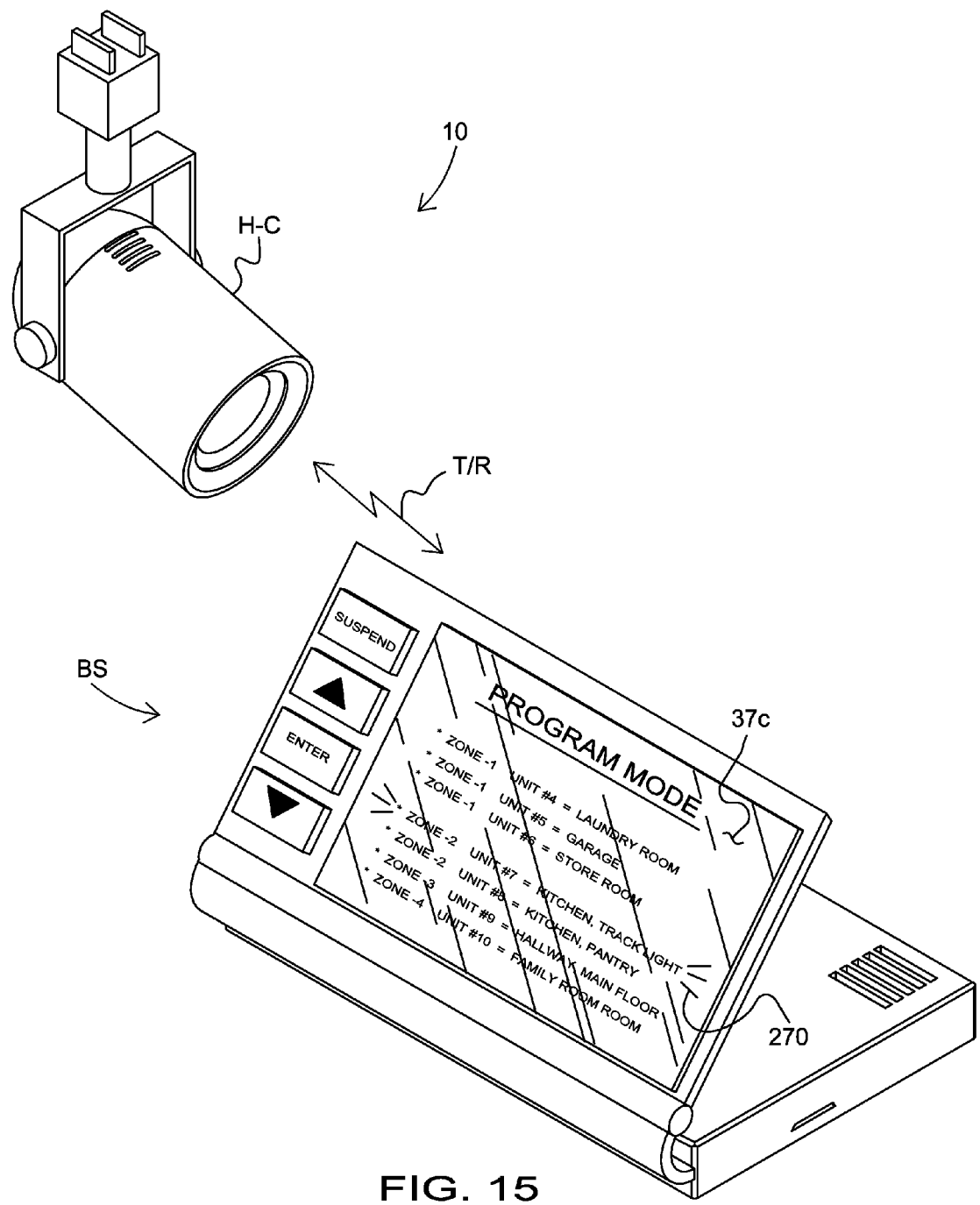
FIG. 15 is an illustration of the base-station in program mode, in accordance with an embodiment of the present invention.

The FIG. 15 is an illustration of the base-station BS in program mode. The display screen 37c shows an example of listed, improved LED light bulb apparatuses 10, identified by ZONE-# & UNIT-#, TYPE of lamp/fixture, and assigned locations. Each new apparatus 10 added to the network, must be registered with the base-station BS through this menu. Registration of an apparatus is accomplished, with the base-station BS in close proximity and in program mode, by toggling VAC line power of the apparatus 10 ON/OFF/ON, within one second (for example). The base-station will recognize the apparatus 10 and down-load via. T/R, a unit ID code 270; making it part of the base-station BS network. The base-station BS must be in the program mode and ready to acknowledge the signal produced by apparatus 10 at the ON/OFF/ON procedure. If the apparatus 10 was moved to a new location, it can be re-programmed in the same manner, to up-date the network.

The following is a discussion of the unit ID code 270, in an example. Each apparatus 10 (manufactured with a microprocessor as in FIG. 1a) has an eight-character code. The first two hex digits are identifying it as a manufacturing iteration and model (M-ID). When being programed, via a base-station BS, the base-station assigns a HOUSE code of three hex digits and a UNIT ID of two hex digits. There is also a single hex digit, in the eight-character hex code, as an ALARM CATEGORY code. Below is a ID Code Communications Table-1 for illustrating the apparatus 10, eight hex character unit ID code 270, and its permutations possibilities.

| ID Code Communications Table-1 | | | |
| --- | --- | --- | --- |
| M-ID code | HOUSE code | UNIT code | ALARM CATEGORY code |
| # CHARACTERS: XX | XXX | XX | X |
| POSSIBLE VARIATIONS: 265 | 4096 | 256 | 16 |

With every communication event between a base-station BS and any apparatus 10, the unit ID code 270 immediately identifies it with the manufacturing model, the home it is assigned to, the type/style of lamp/fixture it is, and when alarming, the alarm category. For example, and referencing FIG. 15, if the apparatus 10 was only a smoke detector type device (not incorporating a carbon monoxide or gas detectors) would be identified in the first two hex digits, the M-ID code. While assigned into ZONE-2 as being the kitchen area, and UNIT-#7 of the track lighting variety. The last character stating the unit was in a 'functionally working' and 'quiescent', quit state.

The base-station BS is uniquely an important 'center' of information as part of the present invention network of devices. The inventors have detailed an identifying protocol (270) to communicate between each other. But it is explicitly understood that other protocols, and particularly the BACnet (Building Automation and Control Network) standard as one that would work well. Further, the inventors know that mobile phone APPs (applications), could duplicate the workings of the base-station, and therefore some may feel it unnecessary (indeed the inventors have drawn-up such an APP. to work 'with' the base-station, not instead of it). But, giving the importance of the base-station, within the network of smoke, carbon monoxide and gas detection apparatuses, and, the seriousness of an event happening; just having a mobile phone to do the base-station's job is NOT enough.

Over time, mobile phones are OFF, their battery go dead because of their multiple uses, they go missing (such as mom goes to the store with the mobile phone and no other mobile phone with the APP. is in the house, etc). So the inventors have plainly made clear, that a base-station 'needs' well outweighs any argument that a mobile phone can do the same function—period. However, it is explicitly understood, that the base station (BS, 37a, 37b, 37c) can, either along with or be incorporated via software into, other 'conveniences' electronic devices. These devices, such as Amazon Corporation's Alexa/Echo system, or Google's Home system, etc., and can further augment the base-station/control center of the present invention; making them even more useful.

In FIGS. 16a through 16c are an illustrations of the present invention networking, where a single unit detects smoke and alarms; and how the apparatuses 10 works in conjunction with each other and the base-station comprising the network and system of the present invention. FIG. 16a shows an apparatus 10, alarming-smoke 272 (which would be red & white strobing LED's), with its transmitting range indicated by alarming unit range 274. If the base-station is within the range of the alarming unit (in this case ZONE-2, UNIT-#8), the base-station would immediately indicate the exact apparatus 10 alarming danger of smoke. If not in range, as is seen the FIG. 16b, illustrates how the network would relay the alarming unit 272, to repeat alarm units 276 (being within the range 274 of the alarming unit 272).

Thus, the $1^{st}$ repeat alarm 276 would strobe green & white and re-transmit the event that unit 272 detecting smoke. And now referring to FIG. 16c it is further shown, the $2^{nd}$ repeat alarm 280, being in the $1^{st}$ repeating unit's range 278, would also strobe green & white LED's and re-transmit the original detecting unit 272 alarming smoke. The base-station BS in the scenario, also being in one of the $2^{nd}$ repeat unit's 280 range would verbally announce via speaker 258, speech 284; that smoke was detected in the kitchen pantry, while displaying on the screen 37c the exact details of the category of alarm, where it is and which units it is. It is important to understand the all this 'hand-shaking' via ID code within the network of apparatuses 10 and base-station BS, are synchronized and accomplished in just a few moments of time, making the system highly useful and practical no matter how large and spread-out a structure is containing the present invention of network-registered devices.

Figure 17:
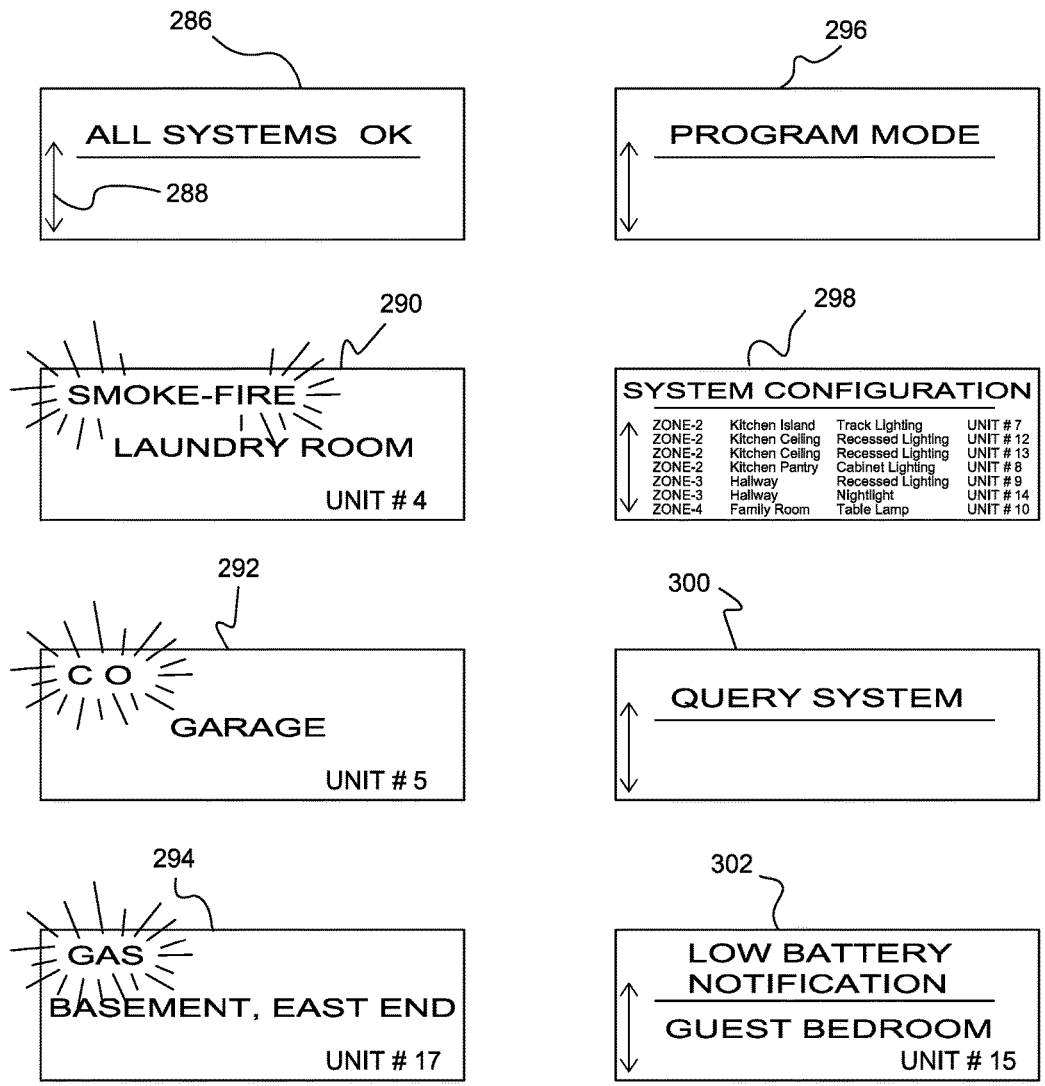
FIG. 17 are examples of various screens, menus and displays of the base-station of the present invention, in accordance with an embodiment of the present invention.

In FIG. 17 are examples of various screens, menus and displays on the base-station BS, of the present invention, screen 37c. When every apparatus 10 is in a quiescent state 216 (referencing FIG. 11), then display screen 286 appears with an 'ALL SYSTEMS OK' message. Certain display screens have a screen scroll indicator 288, which indicated that the base-station BS 'up' & 'down' pushbuttons 264 & 268 are accessible and the user may scroll to other screens; such as 'PROGRAM MODE 296, SYSTEM CONFIGURATION 298 and QUERY SYSTEM 300, etc. Should there be a low battery in the network (any apparatus 10 or the base-station BS) a LOW BATTERY NOTIFICATION 302 screen appears. The message in screen 302 also indicates the exact unit number and location so corrective action can be taken, e.g., turn VAC line power ON to recharge the battery of the device giving notice.

The program mode 296 was disclosed in detail in FIGS. 14 & 15. The system configuration screen 298 shows all the apparatuses 10 in the network; giving which zone, what location, type of apparatus and unit number information. With the query system screen 300, enters a test function menu that brings up each individual apparatus 10 registered in the network. The query system then can command the apparatus 10 to give a single audible burst follow by a single white strobe, a single green strobe, and, alarm colors of a single red strobe, a single amber strobe, and a single blue strobe of the LED's (if said unit is equipped with all three detecting features, else it would only strobe the color of the particular sensor type, i.e., red smoke, amber carbon monoxide and blue gas).

The display screen 300 would show the exact model of the apparatus being queried via the unit ID code 270 earlier mentioned. The query system screen 300 display, automatically scrolls through all units within a designated zone number, to fully test the networks functionality, as described above with 'pinging' each apparatus 10 to do a single burst and strobe of light. Any unit not giving an audible burst or expected LED strobe (as indicated in the display on the base-station screen 300) could be immediately seen as defective, and can be replaced. Other 'testing' schemes can certainly be implemented, to include the silence commands, and be within the scope of the query system 300 of the present invention.

The three alarm screens, SMOKE/FIRE 290, CO (carbon monoxide) 292, and GAS 294 are all the important indicators of the system. When any apparatus 10, either directly received via T/R signals (referencing FIGS. 14 & 15), or repeat relayed T/R signals, would activate one of these screens in their respective categories. The screens 290, 292 and 294 also indicate the exact location and unit number, and, the speaker 258 would annunciate the message 284 in exact detailed speech. For example, the audible alert, "SMOKE-FIRE, LAUNDRY ROOM."

Figure 18A:
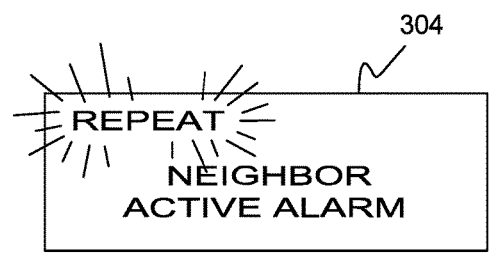
FIG. 18a is an illustration of the repeat features of the present invention in a close proximity setting, in accordance with an embodiment of the present invention.
Figure 18B:
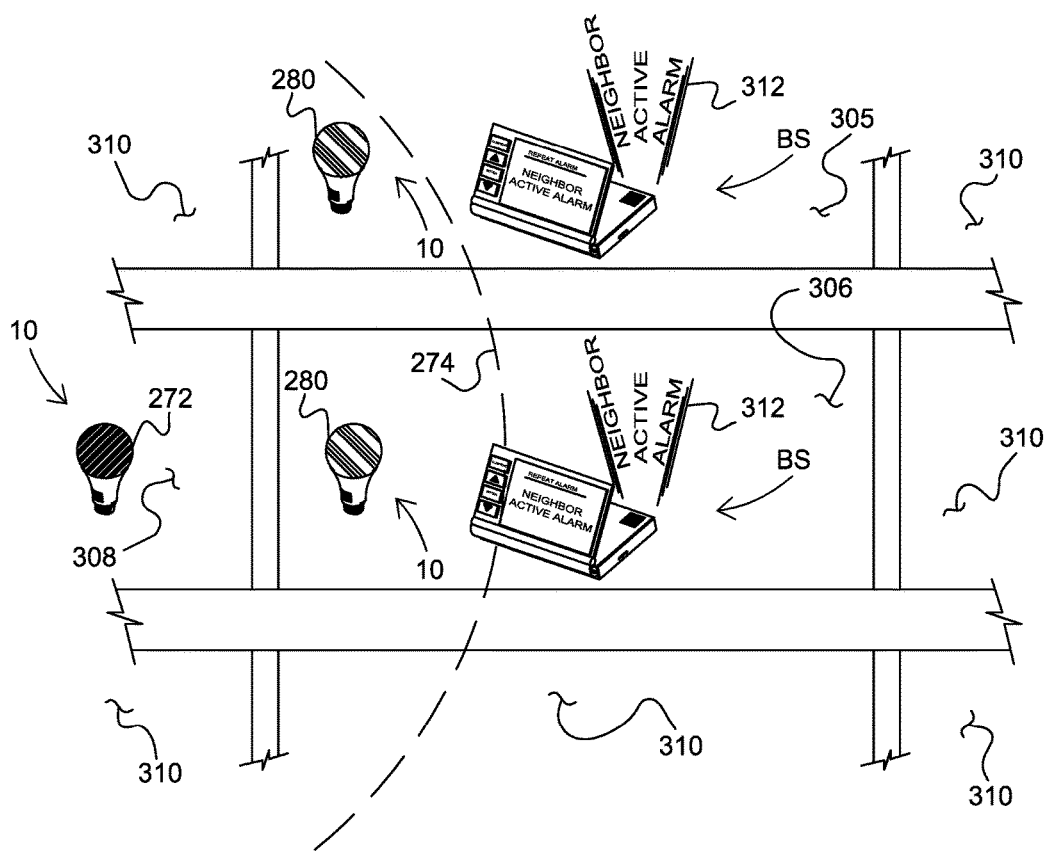
FIG. 18b is an illustration showing a neighboring, non-registered apparatus, triggers an early warning alarm, in accordance with an embodiment of the present invention.

Finally, in FIGS. 18a and 18b are illustrations of a second feature of the repeat function of the present invention, in a close proximity setting (such as an adjacent apartment in complex), showing a neighboring, non-registered apparatus 10; triggers an early warning alarm. FIG. 18a shows the base-station BS message 304, if a neighboring apparatus 10 device was alarming in any category. The message 304 would alarm in the repeat (green strobing LED's) mode, and give early warning that a potential danger event exists nearby. FIG. 18b shows an illustration scenario of a multi-floor complex (such as an apartment building or high-rise building), having a plurality of individual dwellings 305, 306, 308 and 310.

The apparatus 10 in dwelling 308 is alarming 272 (as referenced in FIG. 16). The nearby dwellings 305 and 306, with the present invention, and within range 274, triggers a repeat alarm 280 respectively in their exclusive network. The alarming 280 apparatuses 10 would strobe with the white and green LED's as usual and the base-stations BS would respond in their respective networks. But this time, since the unit ID code 270 (as referenced in FIG. 15), is not one of the registered networks of 305 or 306 apparatuses 10, would display the message 304 and the annunciate 312 verbally; indicating a nearby neighbor has an alarm event.

Discussing the FIGS. 14 through 18 in operation with the base-station BS of the present invention, and, the relationship with the present invention apparatus 10, comprising an improved LED light bulb with alarming for smoke, carbon monoxide and gas in a system network is as follows. Apparatus 10 being programed with a unique unit ID code 270, via a base-station BS, becomes a component of a network of light devices having detecting means for dangerous smoke, carbon monoxide or gas, within a dwelling/structure. Any number of devices, (apparatus 10 in any style/type housing configurations) can be programed into the network and registered by its unique unit ID code 270. If any individual unit triggers an alarm event (either smoke, carbon monoxide or gas).

The base-station displays visually and annunciates the exact alarming unit location and category of alarm. The apparatus 10 having a repeat feature, strobing green LED's that indicate a danger is nearby but not immediately present, give warning for occupants to exit to safety; away from any red, amber or blue strobing LED apparatus 10 which indicate immediate danger at its location. In the case of a false alarm, the alarm can be silenced by simply telling it (base-station BS or apparatus 10) verbally to SHUT OFF; using any two sharply structured reverberations (words/syllables) in a sequence of speech sounds.

There can be as many base-stations BS within the network as desired, all sharing the same information and registry information via unit ID code 270. For example, a base-stations for each floor of a dwelling/home, might be one in the basement, one on the first floor and one on second floor. Or, base-stations could be statically located in main areas, such as the kitchen, family room and master bedroom, where occupants gather most and are the cross-paths of activity. The intent is that occupants can very quickly ascertain the exact level of danger, its location and a best route to escape, by its visual and audible announcing the exact danger, and by the apparatus 10 visual and audible alarming of pulsations of sound and colored high intensity strobing of LED lights indicating the exact danger, or possible path to escape the building.

REFERENCES ARE AS FOLLOWS

10 APPARATUS
10b ALTERNATIVE EMBODIMENT OF APPARATUS
12 ELECTRICAL CONNECTION
14 CONDITIONING CIRCUIT
16 DCV POWER REGULATOR CIRCUIT
18 RECHARGE CIRCUIT
20 RECHARGEABLE BATTERY
22 WHITE LED MAIN ARRAY
24 WHITE LED STROBE ARRAY
25 GREEN LED STROBE ARRAY
26 RED LED STROBE ARRAY
27 AMBER OR BLUE LED STROBE ARRAY
28 CONTROL MICROPROCESSOR
30 DETECTOR(s)
30a SMOKE DETECTOR
30b CARBON MONOXIDE DETECTOR
30c GAS

32 AUDIBLE/VISUAL ALARM CIRCUIT
33 TEST ALARM
34 SILENCE CIRCUIT
36 RF COMMUNICATIONS CIRCUIT
BS BASE-STATION
37a BASE-STATION (electronics)
37b BASE-STATION (power circuit)
37c BASE-STATION (display & controls)
T/R RF TRANSMIT/RECEIVE SIGNALS
38 LINE (interconnecting)
39 LINE (interconnecting)
40 LINE (interconnecting)
41 LINE (interconnecting)
42 LINE (interconnecting)
44 LINE (interconnecting)
46 LINE (interconnecting)
48 LINE (interconnecting)
50 LINE (interconnecting)
52 LINE (interconnecting)
54 LINE (interconnecting)
56 LINE (interconnecting)
58 LINE (interconnecting)
60 LINE (interconnecting)
62 LINE (interconnecting)
64 LINE (interconnecting)
66 MONITOR CIRCUIT
68 LINE (interconnecting)
70 ALARM CONTROL
H-A HOUSING, (Edison style, A-19 envelop light bulb)
72 LIGHT-DEFUSING REFLECTOR
74 ELECTRONICS CASING
76 VENTS
78 ACTIVATING PIN
80 PULL RIBBON
H-B HOUSING, (flood style, BR-30 envelop light bulb)
H-C HOUSING, (track style light fixture)
H-D HOUSING, (recessed style)
H-E HOUSING, (nightlight style)
82 LED LIGHT INTERIOR
84 ELECTRONICS CHAMBER
86 DETECTOR & MICROPHONE SPACE
87 MICROPHONE
88 LED MOUNTING PLATE
90 PARTITION
92 PRINT CIRCUIT BOARD (PCB)
94 SURFACE MOUNTED ELECTRONIC COMPONENTS
96 INTEGRATED CIRCUITS
98 ACTIVATION MEANS (switch)
100 STEP-DOWN (MEANS) TRANSFORMER
102 COUPLING PINS (with 12)
104 FULL BRIDGE
106 RESISTOR/CAPACITOR NETWORK
108 FILTERING CAPACITOR
110 LIMITING RESISTOR
112 ZENER DIODE
114 STEP-DOWN TRANSFORMER
116 STEP-DOWN TRANSFORMER
118 FULL BRIDGE
120 FIXED VOLTAGE REGULATOR
122a ISOLATION DIODE (power via regulator 120)
122b ISOLATION DIODE (power via battery 20)
124 LIMITING RESISTOR
126 PLUS DCV TERMINAL
128 MINUS DCV TERMINAL
130 BATTERY MONITORING CIRCUIT
132 INPUT (microprocessor read)
134 OUTPUT (microprocessor write)
136 3/5 VOLTAGE SOURCE
138 INPUT (discrete circuitry)
140 OUTPUT (discrete circuitry)
142 PHOTO INTERRUPTER (smoke detector sensor)
144 SMOKE ENTRY PORT
146 SIGNAL CONDITIONING MEANS
148 LIMITING RESISTOR
150 LIMITING RESISTOR
152 SIGNAL BALANCING RESISTOR
154 SIGNAL BALANCING RESISTOR
156 SMOKE DETECTED SIGNAL ACTIVE
158 CARBON MONOXIDE (GAS) SENSOR
160 MEASURING RESISTANCE SURFACE
162 SIGNAL CONDITIONING MEANS
164 LIMITING RESISTOR
166 SIGNAL BALANCING RESISTOR
168 SIGNAL BALANCING RESISTOR
170 CARBON MONOXIDE DETECTED SIGNAL ACTIVE
172 'OR' LOGIC GATE
174 TIMER/COUNTER CIRCUITS
176 'AND' LOGIC DRIVER CIRCUIT
178 PIEZO ELECTRIC HORN
180 'NAND' LOGIC DRIVER CIRCUIT
181 MAIN ARRAY STROBE SIGNAL
182 HIGH INTENSITY WHITE LED's
184 'AND' LOGIC DRIVER CIRCUIT
186 HIGH INTENSITY RED LED's
188 'AND' LOGIC DRIVER CIRCUIT
190 HIGH INTENSITY AMBER LED's
192 'AND' LOGIC DRIVER CIRCUIT
194 HIGH INTENSITY GREEN LED's
196 REPEAT ALARM SIGNAL ACTIVE
198 LOW BATTERY 'CHIRP' SIGNAL ACTIVE
200 SILENCE ALARM SIGNAL ACTIVE
202 ACTIVATE MICROPHONE SIGNAL
204 CONDENSER MICROPHONE (sub miniature)
206 OPERATIONAL AMPLIFIER CIRCUIT
208 COUNTER/DIVIDER CIRCUITS
210 SUPPORTING CIRCUIT RESISTORS
212 BATTERY LOW STATE
214 CHIRP SIGNAL
216 QUIESCENT STATE OVAL
218 REPEAT ALARM STATE OVAL
220 ALARM CYCLE WAVEFORM
222 ALARM PULSATION WAVEFORM
224 COLORED LED STROBING WAVEFORM
226 WHITE LED STROBING WAVEFORM
228 TIME-OFF (moment alarm turns OFF)
230 VALID SILENCE COMMAND PULSES
232 SILENCE WINDOW
234 SPURIOUS NOISE DETECTED WAVEFORM
236 SPURIOUS NOISE WITH REAL SIGNALS WAVEFORM
238 FIRST SILENCE RECOGNITION SIGNAL WAVEFORM
240 SECOND SILENCE RECOGNITION SIGNAL WAVEFORM
242 SIGNAL AMPLITUDE THRESHOLD
244 REPEAT ALARM WAVEFORM
246 TIME-ON (moment alarm detected—repeat alarm)
248 AUDIBLE ALARM DETECTED PATTERN
250 ISOLATION DIODE
252 SILICON CONTROLLED RECTIFIER (SCR)
254 LINE (interconnecting)
256 LINE (interconnecting)

258 SPEAKER (base-station)
260 USB COMM. PORT
262 'SUSPEND' PUSHBUTTON (alarm)
264 MENU 'UP' SCROLL ARROW
266 ENTER/SELECT PUSHBUTTON
268 MENU 'DOWN' SCROLL ARROW
270 UNIT ID CODE
272 ALARM—SMOKE (strobing red & white)
274 ALARMING UNIT TRANSMIT RANGE
276 $1^{ST}$ REPEAT ALARM (strobing green & white)
278 $1^{ST}$ REPEAT UNIT TRANSMIT RANGE
280 $2^{ND}$ REPEAT UNIT (strobing green & white)
282 $2^{ND}$ REPEAT UNIT TRANSMIT RANGE
284 SPEECH (announcing fire alarm)
286 'ALL SYSTEMS OK' (display screen)
288 SCREEN SCROLL INDICATOR
290 EXAMPLE, FIRE/SMOKE ALARM (display screen)
292 EXAMPLE, CARBON MONOXIDE ALARM (display screen)
294 EXAMPLE, GAS ALARM (display screen)
296 PROGRAM MODE (display screen)
298 SYSTEM CONFIGURATION (display screen)
300 QUERY SYSTEM (display screen)
302 LOW BATTERY NOTIFICATION (display screen)
304 NEIGHBOR ACTIVE ALARM (repeat)
306 DWELLING WITH PRESENT INVENTION
308 NEIGHBOR'S DWELLING ALARMING (with present invention)
310 OTHER NEIGHBOR'S DWELLING
312 SPEECH (announcing neighbor active alarm)

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An apparatus for a light emitting diode light bulb combined with a smoke detector or a carbon monoxide detector or a gas detector and emitting an audible alarm and a visual alarm, the apparatus comprising:
   a housing envelope having a standard style and shape of a light bulb housing, the housing envelope including at least one of the following: an Edison screw base socket, a flood screw base socket, a recessed fixture, a track-light fixture, and a nightlight fixture, whereby the housing is defined by partitions for separating multiple areas of an internal space within said housing to isolate smoke and gases from light emitting diodes and electronic areas;
   a power conditioner comprising alternating current line voltages;
   a non-replaceable rechargeable battery, said rechargeable battery having an activation pin for actuating said apparatus;
   the audible alarm is a piezo-electric horn and the visual alarm is at least one strobing LED, and, a means to test alarm both audible and visual alarms;
   a silencing alarm operable to verbally command the apparatus to power off with the phrase power-off, said silencing alarm having a microphone to listen for a sound pattern;
   a communicator for alerting multiple apparatuses in a network to repeat an alarm state; and
   a base station for networking with multiple apparatuses, said base station communicating using a radio frequency signal between the light emitting diodes, said base station having a code for programming, said code defined by a program unit ID number;
   wherein said housing comprises a light-diffusing reflector, an electronics casing with vents, and a base with an electrical connector, the housing arranged to replace lighting housing, whereby said detector is defined by a reflective or a transmissive photo interrupter for detecting smoke, whereby an ionization detector and the carbon monoxide and gas is an electro-chemical detector programmed to detect specific gas types, whereby said separate partitioned areas are defined by a light emitting diode light interior space under a light-diffusing reflector, a printed circuit board (PCB) and electronics chamber, an isolated smoke, carbon monoxide and gas detector area, a piezo-electric sounding device, and a microphone space for allowing smoke and gas to enter and exit said isolated detector space, and allowing sound to enter and exit said isolated space.

2. The apparatus of claim 1, wherein said audible alarm and said visual alarm is a piercing pulsation of a rhythmic pattern of colored and white lights for the visual alarm, and an audible sound in three beats ON to one beat OFF.

3. The apparatus of claim 1, wherein said rhythmic pattern of lights and sound is alternating white high intensity light emitting diodes including at least one of the following: red high intensity light emitting diodes for smoke, alternating white high intensity light emitting diodes with amber high intensity light emitting diodes for carbon monoxide, alternating white high intensity light emitting diodes with blue high intensity light emitting diodes for gas, alternating white high intensity light emitting diodes with green high intensity light emitting diodes for a repeat alarm state, and along with an audible piezo-electrical horn, creating a light and sound pattern.

4. The apparatus of claim 1, wherein said communicator comprises an on-board microphone operable to create waveform pulses consistent with sounds that exceed a predetermined amplitude level representing speech commands, or a second apparatus audibly alarming or via transmitting and receiving short range radio frequency signals of the same pattern recognition.

5. An apparatus for a light emitting diode light bulb combined with a smoke detector or a carbon monoxide detector or a gas detector and emitting an audible alarm and a visual alarm, the apparatus comprising:
   a housing envelope having a standard style and shape of a light bulb housing, the housing envelope including at least one of the following: an Edison screw base socket, an flood BR-30 screw base socket, an track-light fixture, an recessed fixture, and an nightlight fixture,
   whereby the housing is defined by partitions for separating multiple areas of an internal space within said housing to isolate smoke and gases from light emitting diodes and electronic areas, said housing comprising a light-diffusing reflector, an electronics casing with vents, and an electrical connector;
   a power conditioner comprising alternating current line voltages;
   a non-replaceable rechargeable battery, said rechargeable battery having an activation pin engaged with a switch for actuating the apparatus when a pull ribbon is removed;

an alarm comprising a piezo-electric horn for the audible and strobing light emitting diodes for the visual pulsations, the alarm operable to test both an alerting alarms function;

a silencing alarm operable to verbally command the apparatus to power off with a shut-off verbal command, said silencing alarm comprising a microphone operable to listen for sound patterns consistent with waveform, said microphone further operable to produce a first and a second silence recognitions waveform that create a valid silence command waveform;

a communicator operable to alert multiple apparatuses in a network to repeat the alarm state;

a network comprising multiple alarm apparatuses; and a base station operable to control the network of alarm apparatuses, the base station operable to communicate using a radio frequency signal between all light emitting diode and detectors, the base station defined by a programmable unit code ID number.

6. The apparatus of claim 5, wherein said smoke detector, said carbon monoxide detector, and said gas detector register a threshold, and wherein said separate partitions create an interior space having a light emitting diode under a light-diffusing reflector, an ionization detector and the gas is an electro-chemical detector programmed to detect specific gas types, whereby said separate partitioned areas are defined by a light emitting diode light interior space under a light-diffusing reflector, a printed circuit board (PCB) and electronics chamber, an isolated smoke, carbon monoxide and gas detector area, a piezo-electric sounding device, and a microphone space for allowing smoke and gas to enter and exit said isolated detector space, and allowing sound to enter and exit said isolated space.

7. The apparatus of claim 5, wherein said audible alarm and said visual alarm emit a piercing pulsation of a rhythmic pattern of colored light emitting diodes, and, white light emitting diodes with sound in three beats ON to one beat OFF in waveform, the visual and audible pattern being instantly recognizable as to what type of danger is present or nearby.

8. The apparatus of claim 5, wherein said rhythmic pattern of lights and sound is alternating white high intensity light emitting diodes with red high intensity light emitting diodes for smoke, alternating white high intensity light emitting diodes with amber or blue high intensity light emitting diodes for carbon monoxide or gas respectively, and, alternating white high intensity light emitting diodes with green high intensity light emitting diodes for a repeat state indicating another apparatus was alarming a danger, and along with an audible piezo-electrical horn creating a visual light and audible sound pattern, that give a sense of urgency.

9. The apparatus of claim 5, wherein said communicator comprises an on-board microphone operable to create waveform pulses consistent with sounds that exceed a predetermined amplitude level representing speech commands or alarm sound patterns, a second apparatus audibly alarming via transmitting and receiving short range radio frequency signals of a coded ID, the coded ID with a unique coding system to additionally establish identification of the device manufacturing iteration, a house code, a unit number and location designator, and an alarm category, and communicating with a base station for programming.

10. The apparatus of claim 5, wherein said audible alarm and said visual alarm are operable to be queried via a base station menu to systematically test every apparatus in both audible and visual means by sequencing of sound and strobing of light, whereby test further allows the network to be silenced from the alarm state with the power down 'shut-off' command.

11. The apparatus of claim 5, wherein said alarm comprises an inactive mode that indicates that multiple apparatuses are in a quiescent state, and whereby the base station is operable to display said quiescent state by message ALL SYSTEMS OK on a display screen, wherein said base station comprises a low battery notification for any one of the multiple apparatuses in the network, wherein said base station displays a location and a unit number to indicate where the alarm is, wherein said alarm comprises a transmit or receive signal communicator, wherein said transmit or receive signal communicator is a short range Blue-Tooth protocol.

12. The apparatus of claim 11, wherein said alarm further comprises an alarm notification on the base-station display of out-of-network repeat alarms, indicating an adjacent apartment in close proximity, in a structure is having an alarm event, and, whereby said base-station generates an early warning of a potential danger.

13. An apparatus for a light emitting diode light bulb, comprising:

the light emitting diode light bulb combined with a smoke detector and at least one of a carbon monoxide detector or a gas detector; wherein the light emitting diode light bulb is adapted to emit an audible alarm and a visual alarm;

a housing, the housing including at least one of an Edison screw base socket, a flood screw base socket, a recessed fixture, a track-light fixture, or a nightlight fixture, whereby the housing is defined by partitions for separating multiple areas of an internal space within said housing to isolate smoke and gases from light emitting diodes and electronic areas;

a power conditioner comprising alternating current line voltages;

a battery having an activation pin for actuating said apparatus;

a silencing alarm operable to verbally command the apparatus to power off; said silencing alarm having a microphone to listen for a sound pattern;

a communicator for alerting multiple apparatuses in a network to repeat an alarm state; and each apparatus having a code for programming, said code defined by a program unit ID number, wherein the code allows identification of the device manufacturing iteration, a house code, a unit number, location designator, and an alarm category.

14. The apparatus of claim 13, further comprising a base station for networking with multiple apparatuses, wherein the base station is operable to program, monitor and display all apparatuses in a building network area; said base station communicating using a radio frequency signal between the light emitting diodes; said base station having a base station code for programming.

15. The apparatus of claim 13, wherein said housing comprises a light-diffusing reflector, an electronics casing with vents, and a base with an electrical connector, the housing arranged to replace lighting housing, whereby said detector is defined by a reflective or a transmissive photo interrupter for detecting smoke, whereby an ionization detector and the carbon monoxide and gas is an electro-chemical detector programmed to detect specific gas types, whereby said separate partitioned areas are defined by a light emitting diode light interior space under a light-diffusing reflector, a printed circuit board (PCB) and electronics chamber, an isolated smoke, carbon monoxide and gas detector area, a piezo-electric sounding device, and a microphone space for allowing smoke and gas to enter and exit said isolated detector space, and allowing sound to enter and exit said isolated space.

16. The apparatus of claim 13, wherein said rhythmic pattern of lights and sound is alternating white high intensity light emitting diodes including at least one of the following: red high intensity light emitting diodes for smoke, alternating white high intensity light emitting diodes with amber high intensity light emitting diodes for carbon monoxide, alternating white high intensity light emitting diodes with blue high intensity light emitting diodes for gas, alternating white high intensity light emitting diodes with green high intensity light emitting diodes for a repeat alarm state, and along with an audible piezo-electrical horn, creating a light and sound pattern.

17. The apparatus of claim 13, wherein said communicator comprises an on-board microphone operable to create waveform pulses consistent with sounds that exceed a predetermined amplitude level representing speech commands, or a second apparatus audibly alarming or via transmitting and receiving short range radio frequency signals of the same pattern recognition.

18. The apparatus of claim 13, wherein the base station is adapted to read non-registered 'like' apparatuses located in an adjacent unit of joined dwellings to provide an early warning alarm.

* * * * *